(12) United States Patent
Nelson et al.

(10) Patent No.: US 9,984,132 B2
(45) Date of Patent: May 29, 2018

(54) COMBINING SEARCH RESULTS TO GENERATE CUSTOMIZED SOFTWARE APPLICATION FUNCTIONS

(71) Applicant: Samsung Electronics Co., Ltd., Suwon-si, Gyeonggi-do (KR)

(72) Inventors: Joseph Nelson, San Francisco, CA (US); Hadar Dor, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/186,472

(22) Filed: Jun. 18, 2016

(65) Prior Publication Data

US 2017/0193062 A1 Jul. 6, 2017

Related U.S. Application Data

(60) Provisional application No. 62/273,482, filed on Dec. 31, 2015.

(51) Int. Cl.
*G06F 17/30* (2006.01)
*G06F 3/0482* (2013.01)
*G06F 3/0484* (2013.01)

(52) U.S. Cl.
CPC ...... *G06F 17/30554* (2013.01); *G06F 3/0482* (2013.01); *G06F 3/0484* (2013.01); *G06F 17/30876* (2013.01)

(58) Field of Classification Search
CPC ............... G06F 17/30; G06F 17/30554; G06F 17/30876; G06F 3/0482; G06F 3/0484
See application file for complete search history.

(56) References Cited

U.S. PATENT DOCUMENTS

| 9,348,671 | B1* | 5/2016 | Chen .................. G06F 11/3003 |
| 9,418,103 | B2* | 8/2016 | Shapira ............. G06F 17/30395 |
| 9,608,870 | B1* | 3/2017 | Hendriks ................ H04L 41/22 |
| 2006/0155751 | A1* | 7/2006 | Geshwind ........... G06F 17/3064 |
| 2007/0244902 | A1 | 10/2007 | Seide et al. |

(Continued)

OTHER PUBLICATIONS

Jiang et al. GestureQuery: A Multitouch Database Query Interface. Proceedings of the VLDB Endowment, vol. 6, No. 12 Copyright 2013 VLDB Endowment 2150-8097/13/10. 4 pages.*

(Continued)

*Primary Examiner* — Amy M Levy
(74) *Attorney, Agent, or Firm* — Jefferson IP Law, LLP

(57) ABSTRACT

Techniques include displaying, at a user device, a user-selectable link associated with a search result that specifies a state of a software application (app). The state is associated with one or more entities (e.g., business, franchise, product, or service names, and/or geographic locations). The link is configured to, upon being selected, cause the device to set the software app into the state. The techniques further include receiving, at the device, an input from a user. The input specifies a mathematical operation to be performed based on the entities. The techniques include, in response to receiving the input, performing the operation. The techniques also include, in response to performing the operation, displaying another user-selectable link configured to, upon being selected, cause the device to set the same or a different software app into another state that is associated with at least one of the entities.

16 Claims, 14 Drawing Sheets

(56) References Cited

U.S. PATENT DOCUMENTS

| | | | | |
|---|---|---|---|---|
| 2010/0077473 | A1* | 3/2010 | Ohta | G06F 21/52 |
| | | | | 726/17 |
| 2011/0191332 | A1* | 8/2011 | Barve | G06F 17/30 |
| | | | | 707/723 |
| 2012/0124061 | A1* | 5/2012 | Macbeth | G06F 9/445 |
| | | | | 707/749 |
| 2014/0244786 | A1* | 8/2014 | Shapira | H04L 67/10 |
| | | | | 709/217 |
| 2014/0250147 | A1* | 9/2014 | Shapira | G06F 17/30864 |
| | | | | 707/770 |
| 2014/0317104 | A1* | 10/2014 | Isaacs | G06F 17/30554 |
| | | | | 707/728 |
| 2015/0302036 | A1* | 10/2015 | Kumar | G06F 17/30867 |
| | | | | 707/711 |
| 2015/0379128 | A1* | 12/2015 | Chang | G06F 17/30864 |
| | | | | 707/711 |
| 2016/0210334 | A1* | 7/2016 | Prophete | G06F 3/04847 |
| 2016/0239569 | A1* | 8/2016 | Levy | G06F 17/30598 |
| 2017/0061010 | A1* | 3/2017 | Lee | G06F 17/30867 |

OTHER PUBLICATIONS

AppURL.org. AppURL connects native apps to the web with http URLs. Available via web on Aug. 4, 2013. Retrieved via Internet Archive on Nov. 3, 2016. 9 pages.*

Akiyama et al. An Advanced Search Interface for Mobile Devices. HCCE '12, Mar. 8-13, 2012, Aizu-Wakamatsu, Fukushima, Japan. Copyright 2012 ACM 978-1-4503-1191-5. 6 pages.*

* cited by examiner

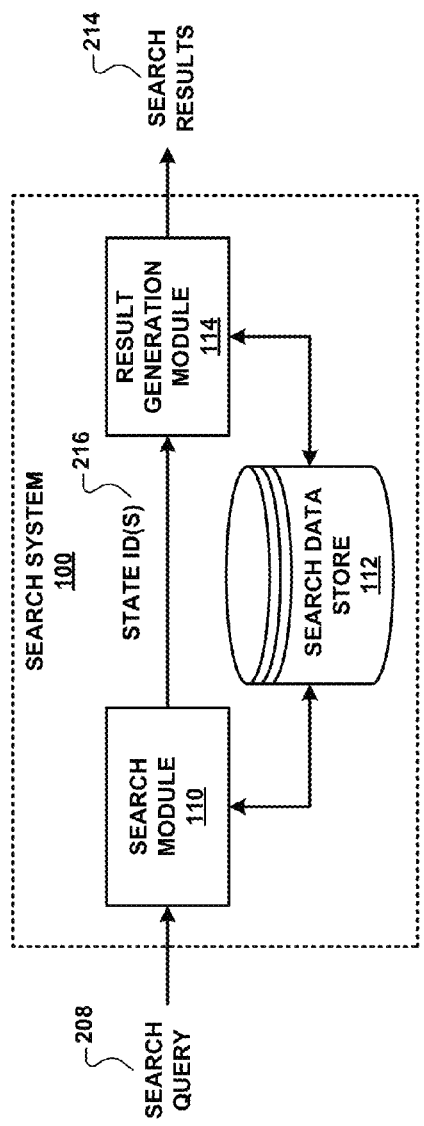
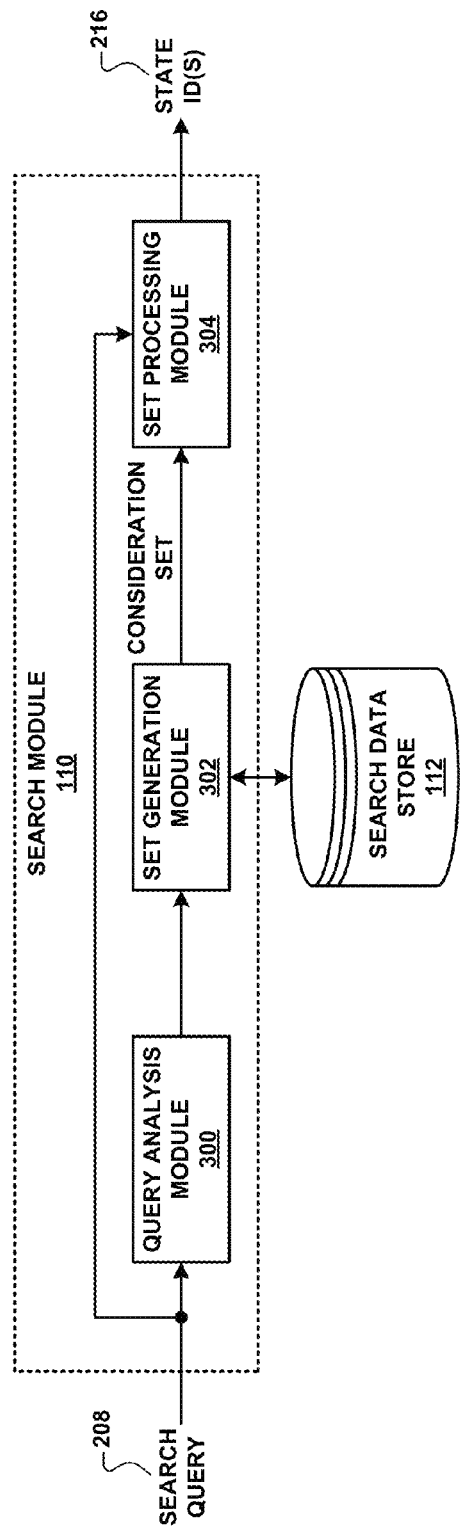

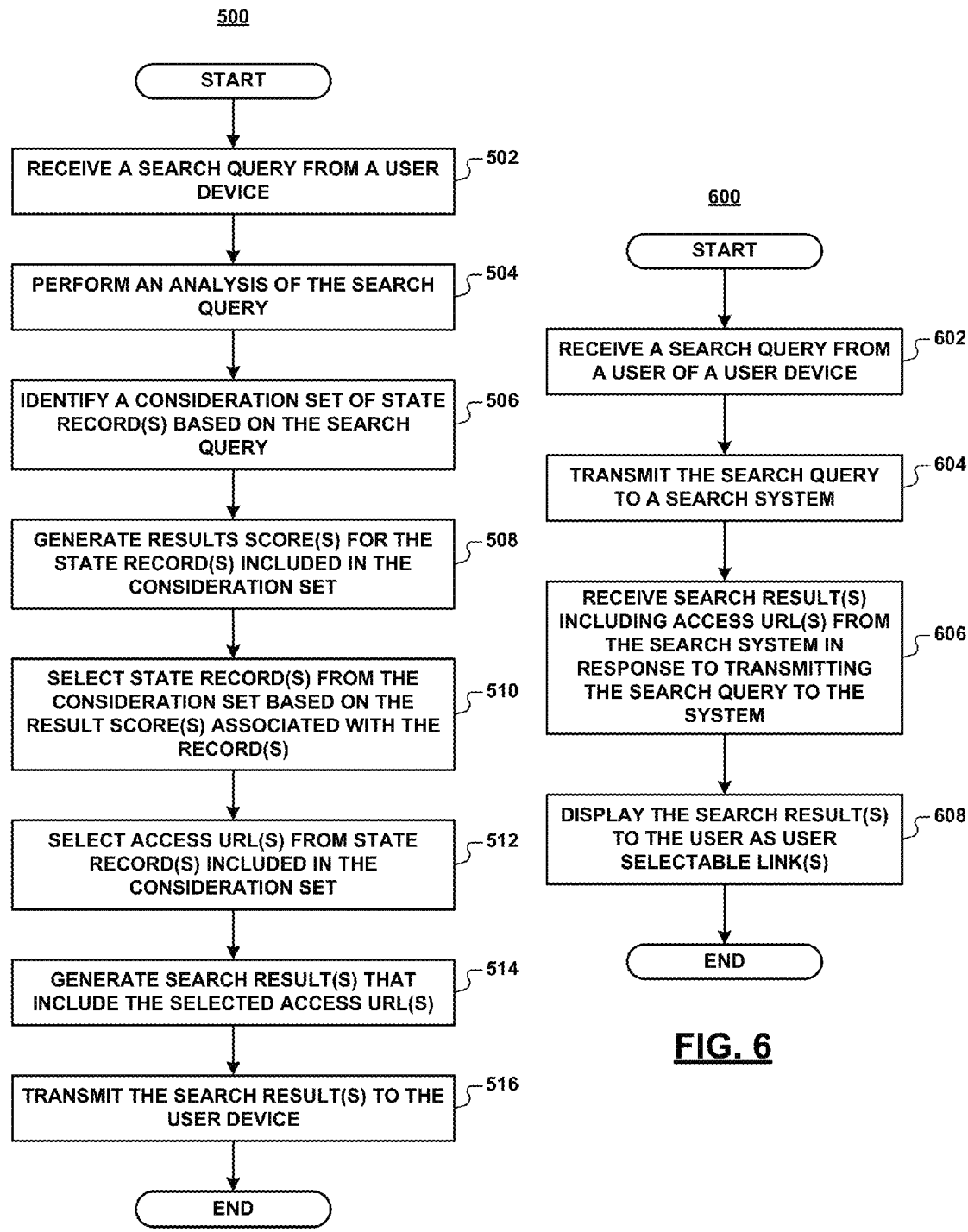

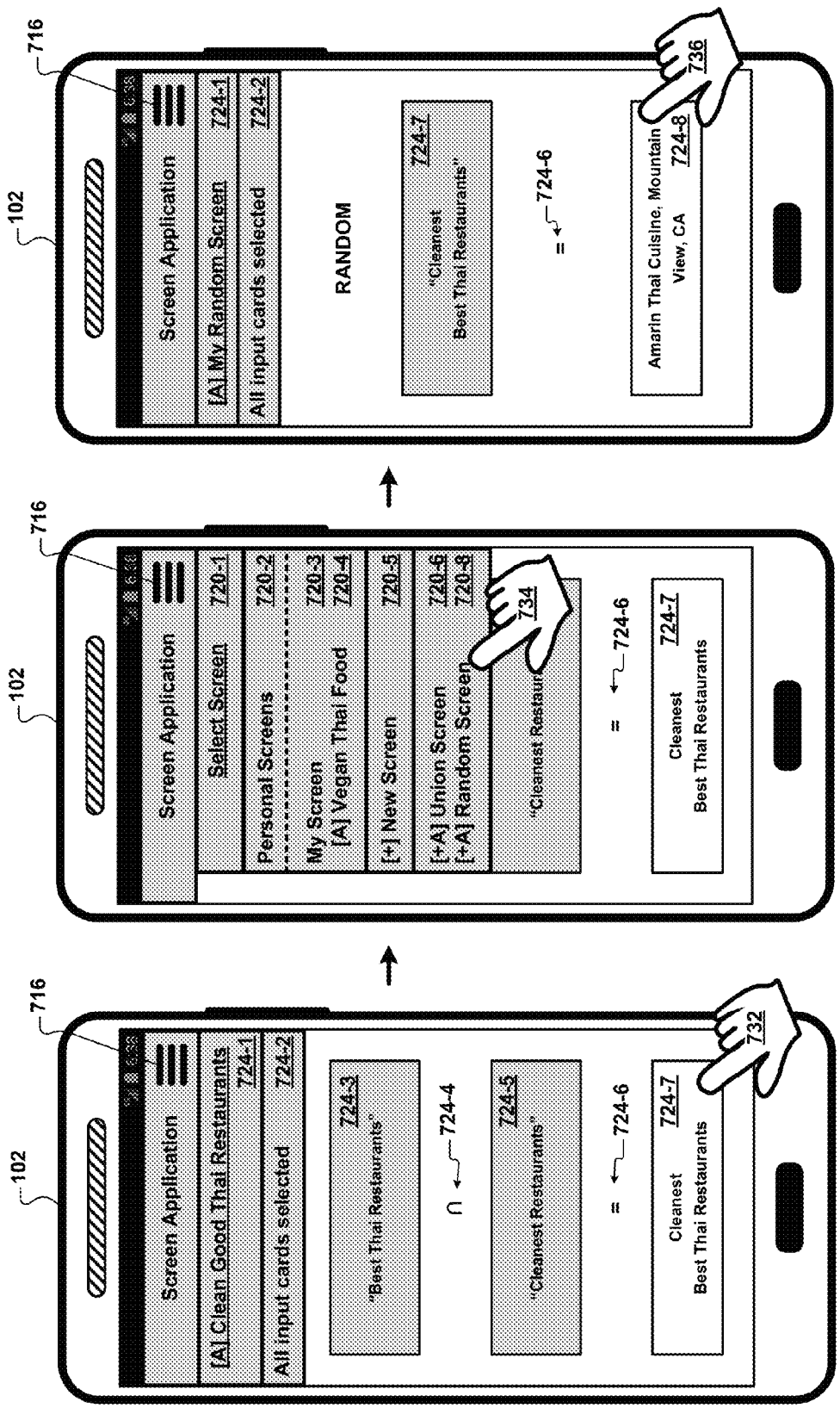

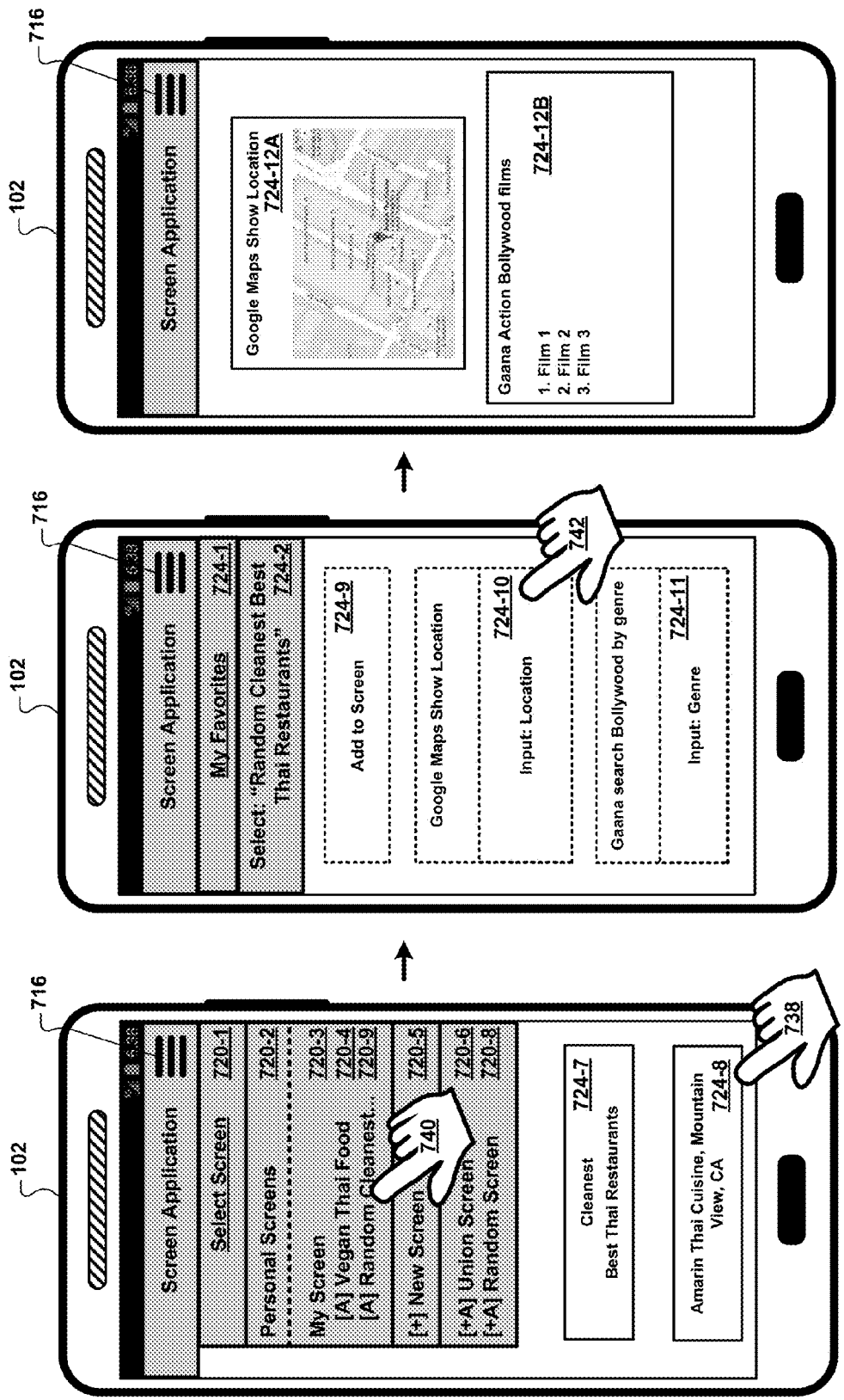

COMBINING SEARCH RESULTS TO GENERATE CUSTOMIZED SOFTWARE APPLICATION FUNCTIONS

CROSS-REFERENCE TO RELATED APPLICATIONS

This application claims the benefit of U.S. Provisional Application 62/273,482, filed on Dec. 31, 2015. The entire disclosure of the application referenced above is incorporated by reference.

FIELD

This disclosure generally relates to the field of search, and more particularly to techniques for generating search results that correspond to states of software applications.

BACKGROUND

In recent years, the use of computers, smartphones, and other Internet-connected computing devices has grown significantly. Correspondingly, the number of software applications (apps) available for such computing devices has also grown. Today, many diverse software apps can be accessed on a number of different computing devices, including smartphones, personal computers, automobiles, and televisions. These software apps may include business driven apps, games, educational apps, news apps, shopping apps, messaging apps, media streaming apps, and social networking apps. Because of the large number of software apps available today and the wide range of functionality they provide, computing device users often require the ability to search for and access specific software app functionality.

SUMMARY

In one example, a method comprises displaying, at a user device, a first user-selectable link associated with a search result. The search result includes a first access uniform resource locator (URL) that specifies a first state of a first software application (app). The first state is associated with one or more entities. The first user-selectable link is configured to, upon being selected by a user input, cause the user device to set the first software app into the first state. The method further comprises receiving, at the user device, a user input from a user of the user device. The user input specifies a mathematical operation to be performed based on the one or more entities. The method further comprises, in response to receiving the user input, performing the mathematical operation based on the one or more entities. The method also comprises, in response to performing the operation, displaying a second user-selectable link. The second user-selectable link is configured to, upon being selected by a user input, cause the user device to set a second software app into a second state specified by a second access URL. The second state is associated with at least one of the one or more entities.

In another example, a computing device comprises a display, an input/output (I/O) component configured to receive a user input from a user of the device, one or more memory components configured to store computer-readable instructions, and one or more processing units configured to execute the instructions. The instructions, when executed by the processing units, cause the processing units to display a first user-selectable link associated with a search result using the display. The search result includes a first access URL that specifies a first state of a first software app. The first state is associated with one or more entities. The first user-selectable link is configured to, upon being selected by a user input, cause the computing device to set the first software app into the first state. The instructions further cause the processing units to receive the user input from the user using the I/O component. The user input specifies a mathematical operation to be performed based on the one or more entities. The instructions further cause the processing units to, in response to receiving the user input, perform the mathematical operation based on the one or more entities. The instructions also cause the processing units to, in response to performing the operation, display a second user-selectable link using the display. The second user-selectable link is configured to, upon being selected by a user input, cause the computing device to set a second software app into a second state specified by a second access URL. The second state is associated with at least one of the one or more entities.

BRIEF DESCRIPTION OF THE DRAWINGS

The details of one or more examples are set forth in the accompanying drawings and the description below. Other features, objects, and advantages will be apparent from the description and drawings, and from the claims.

FIG. 3A is a functional block diagram of an example search system.

FIG. 3B is a functional block diagram of an example search module.

FIG. 5 is a flow diagram that illustrates an example method for generating search results specifying software application (app) functions using a search system.

FIG. 6 is a flow diagram that illustrates an example method for generating search results specifying software app functions using a user device.

DETAILED DESCRIPTION

Figure 1:
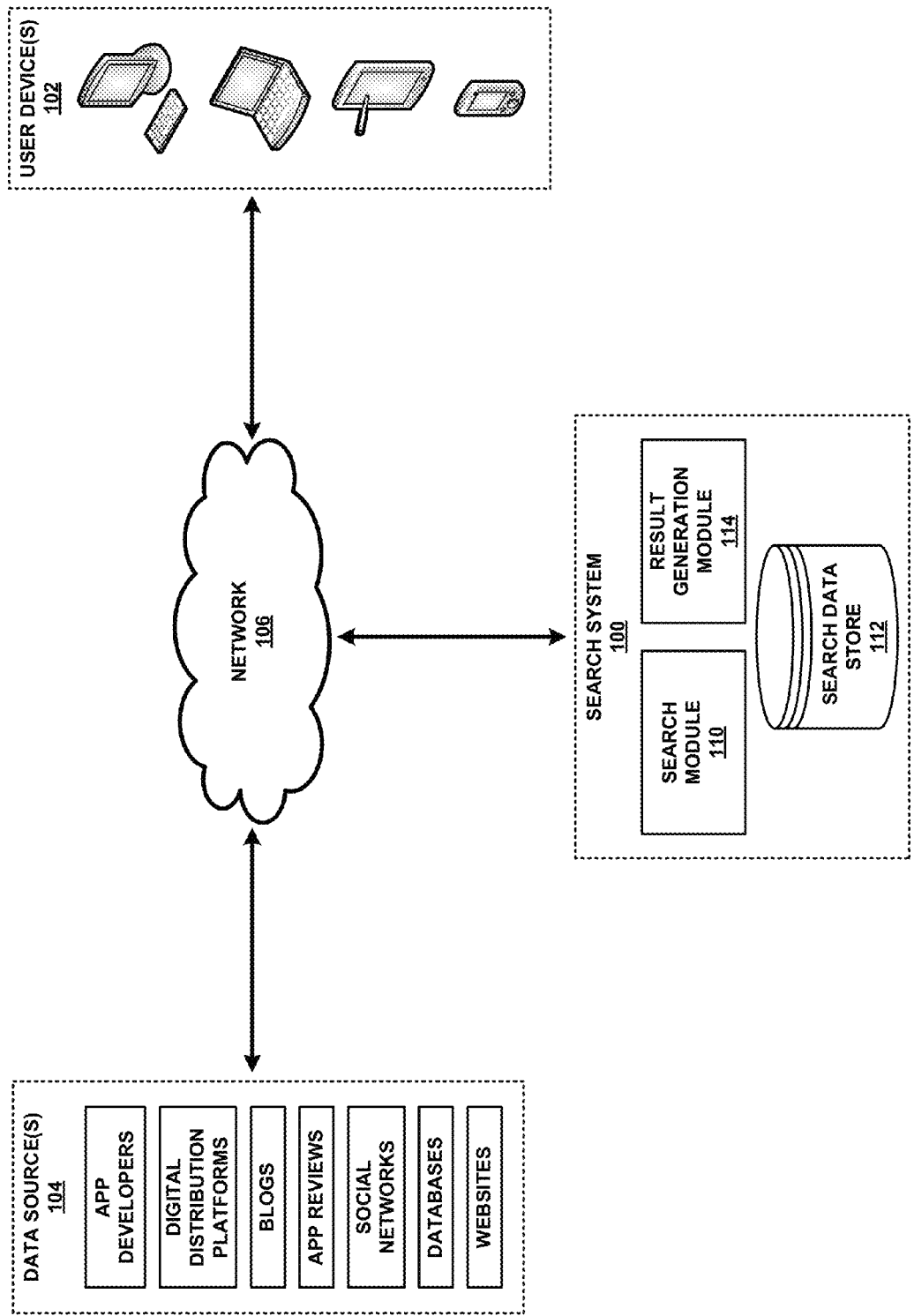
FIG. 1 illustrates an example environment that includes a search system, one or more data sources, and one or more user devices that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for generating and displaying search results that specify states of software applications (apps). According to the disclosed techniques, a user of a user device (e.g., a mobile device) may input a search query (e.g., a text string) into a search field of a search app executing on the device. The user may then cause the user device (e.g., the search app) to transmit the search query to a search system. The search system may receive the search query from the user device, generate one or more search results that each specify a state of a software app, and transmit the results to the device. The user device may receive the search results from the search system and display each result to the user as a user-selectable link with text and images. Additionally, or alternatively, the user device may receive the search results from another user device using any of a variety of messaging applications.

The user device may display first and second user-selectable links associated with first and second ones of the search results. Each user-selectable link may specify a state of a software app. The state may be associated with one or more entities, such as business or franchise names, product or service names, and geographic locations, as some examples. Each user-selectable link may be configured to, upon being selected by a user input, cause the user device to set the corresponding software app into the associated state. For example, the user device may display the first and second user-selectable links within a graphical user interface (GUI), which may be referred to herein as a "Screen App." The user device may further receive a user input from the user and, in response to receiving the input, display a third, different user-selectable link that is generated by combining the first and second user-selectable links using any of a variety of mathematical operations. Alternatively, the user device may generate the third user-selectable link based on one of the first and second user-selectable links and the mathematical operations. The third user-selectable link may specify a state of a software app. The state specified by the third user-selectable link may be associated with a function (e.g., a unique function) that is performed based on any combination of the entities associated with one or more of the first and second states (e.g., using any of set, arithmetic, logic, bitwise, and other operations). The third user-selectable link may be configured to, upon being selected by a user input, cause the user device to set the corresponding software app into the associated state.

In this manner, the techniques of the present disclosure may, in some examples, improve the user's experience by enabling the user to generate new search results that provide functionality that is defined by and thus tailored to the user. Specifically, the techniques may enable the user to manipulate one or more search results using one or more mathematical operations in order to generate one or more new results having unique functionality.

FIG. 1 illustrates an example environment that includes a search system 100 and one or more user devices 102 and data sources 104 that communicate via a network 106. The network 106 through which the above-described systems, devices, and sources communicate may include any type of network, such as a local area network (LAN), a wide area network (WAN), and/or the Internet. The search system 100 includes a search module 110, a search data store 112, and a result generation module 114. In the example of FIG. 1, the search system 100 receives a search query from one of the user device(s) 102 and generates one or more search results in response to receiving the query. Specifically, the search system 100 generates the search results based on the search query and information included in one or more state records stored in the search data store 112. In this example, each state record may specify a state of a software app. In particular, each state record may include one or more access uniform resource locators (URLs) that enable the user device(s) 102 to access the state specified by the record. The search system 100 transmits the access URLs included in the state records to the user device 102 as part of the search results. The state records may also include state information (SI), such as text, and other data, such as state identifiers (IDs), which the search system 100 may use to identify the records in the search data store 112. The search system 100 transmits the search results, including the access URLs, to the user device 102, which displays the results to a user of the device 102 as one or more user-selectable links that include the access URLs.

To generate the search results, the search module 110 may identify one or more state records included in the search data store 112 based on the search query. Initially, the search module 110 may optionally analyze the search query. The search module 110 may then identify the state records using the search query (e.g., the analyzed search query). For example, the search module 110 may identify the state records based on matches, such as text matches, between terms of the search query and terms of information, such as SI and/or state IDs, included in the records. The search module 110 may further process the identified state records (e.g., generate a result score for each record, thereby ranking the records). For example, the search module 110 may determine how well the identified state records match the search query. The search module 110 may then select one or more of the identified state records that best match the search query (e.g., select records having the largest result scores). The search module 110 may subsequently transmit indications, such as state IDs, of the selected state records to the result generation module 114. The result generation module 114 may receive the indications of the state records selected by the search module 110 from the search module 110 and identify the records in the search data store 112 using the received indications. The result generation module 114 may then select one or more access URLs from the identified state records and transmit the selected access URLs to the user device 102 as the search results.

In some examples, the result generation module 114 may transmit additional information to the user device 102 along with the access URLs. For example, as described herein, the search module 110 may generate result scores for the state records from which the result generation module 114 selects the access URLs (e.g., using values of various metrics associated with the persons, places, or things described by the records and/or any number of features associated with the search query). As such, each access URL may be associated with a result score that indicates an order/rank of the access URL relative to one or more other ones of the access URLs. In some examples, the result generation module 114 may transmit the result scores associated with the access URLs and the corresponding state records to the user device 102 along with the access URLs. Additionally, or alternatively, the result generation module 114 may transmit display data, such as text and/or image data, associated with the access URLs and the corresponding state records to the user device 102 along with the access URLs.

Upon receiving the search results from the search system 100, the user device 102 may display the results to the user as one or more user-selectable links. As described herein, each search result may include an access URL that specifies a state of a software app. As also described herein, the state may be associated with one or more functions/actions (e.g., making a restaurant reservation, reading user reviews, and writing a user review) that are each performed based on one or more entities as part of the state. As further described herein, the entities may include names of specific businesses or business franchises, geographic locations, names of products or services, or other entities or entity types. Upon the user device 102 displaying the user-selectable links, the user may interact with the links (e.g., combine the links using Screen Apps) in the manner described herein.

In this disclosure, a software app may refer to computer software that causes a computing device to perform a task. In some examples, a software app may be referred to as an "app" or a "program." Example apps include word processing apps, spreadsheet apps, messaging apps, media streaming apps, social networking apps, and games. Apps can be executed on a variety of different computing devices. For example, apps can be executed on mobile computing devices, such as smartphones, tablets, and wearable computing devices (e.g., smart watches, fitness bands, and headsets, such as smart glasses). Apps can also be executed on other types of computing devices having other form factors, such as laptop computers, desktop computers, and other consumer electronic devices (e.g., smart home appliances, home networking devices, and home automation devices). In some examples, apps may be installed on a computing device prior to a user purchasing the device. In other examples, the user may download and install apps on the computing device after purchasing the device. A native app, as used herein, may refer to an app that is installed and executed on a user device. A web-based app, in turn, may refer to an app that is accessible from a user device via a web browser app.

In some examples, the functionality of an app may be accessed on the computing device on which the app is installed. Additionally, or alternatively, the functionality of an app may be accessed via a remote computing device. In further examples, all of an app's functionality may be included on the computing device on which the app is installed. Such apps may function without communication with other computing devices (e.g., via the Internet). In additional examples, an app installed on a computing device may access information from other remote computing devices during operation. For example, a weather app installed on a computing device may access the latest weather information via the Internet and display the accessed information to the user. In still other examples, an app, such as a web-based app, may be partially executed by a user's computing device and partially executed by a remote computing device. For example, a web-based app may be executed, at least in part, by a web server and accessed by a web browser app of a user's computing device. Example web-based apps include web-based email sites, online auction sites, online retail sites, and other websites.

An access URL, as used herein, may include any of a native app access mechanism (AM) (hereinafter, "AAM") and a web AM (hereinafter, "WAM"). As such, a user device 102 of the present disclosure may use an access URL to access the functionality provided by a native or web-based app. For example, a user of the user device 102 may select a user-selectable link that includes the access URL to access the functionality of the native or web-based app.

An AAM may be a string that references a native app and indicates one or more operations for a user device 102 and/or the app to perform. If a user of the user device 102 selects a user-selectable link that includes the AAM, the device 102 may launch the native app and perform the operations (e.g., cause the app to perform the operations). In other words, the user selecting the user-selectable link may cause the user device 102 to launch the native app and set the app into a state that corresponds to the operations (e.g., a state in which the app displays a graphical user interface (GUI) or a screen). As a result, the native app may be configured to display one or more products, services, or vendors, to the user via a display device. In this manner, the AAM may specify the state of the native app. The state, in turn, may refer to the operations indicated by the AAM and/or the outcome of the native app performing the operations in response to the user selecting the user-selectable link including the AAM.

A WAM may include a resource ID referencing a web resource (e.g., a page of a web-based app, or website). For example, the WAM may include a URL, such as a web address, used with the hypertext transfer protocol (HTTP). If a user of a user device 102 selects a user-selectable link including the WAM, the device 102 may launch a web browser app included on the device 102 and retrieve the web resource referenced by the resource ID. Stated another way, if the user selects the user-selectable link, the user device 102 may launch the web browser app and access a state (e.g., a web page) specified by the WAM. In some examples, a WAM included in a state record along with an AAM may specify a state of a web-based app that is equivalent or analogous to a state of a native app specified by the AAM.

In some examples an AAM may be associated with an app download mechanism (ADM). An ADM may specify a location, such as a digital distribution platform (e.g., Google Play® by Google Inc.) where a native app may be downloaded (e.g., a native app referenced by an AAM). In some examples, a state record may include an ADM along with an AAM and a WAM. In these examples, the ADM may specify a location, such as a digital distribution platform, from which a native app referenced by the AAM may be downloaded.

According to the techniques described herein, the user device 102 may display a first user-selectable link associated with a particular search result. The search result may include a first access URL that specifies a first state of a first software app. The first state may be associated with one or more entities. The first user-selectable link may be configured to, upon being selected by a user input, cause the user device 102 to set the first software app into the first state. The user device 102 may further receive a user input from a user of the device 102. The user input may specify a mathematical operation to be performed based on the one or more entities. The user device 102 may still further, in response to receiving the user input, perform the mathematical operation based on the one or more entities. The user device 102 may also, in response to performing the operation, display a second, different user-selectable link. The second user-selectable link may be configured to, upon being selected by a user input, cause the user device 102 to set a second software app, which may be the same as the first software app in some examples, into a second, different state specified by a second, different access URL. The second state may be associated with at least one of the one or more entities.

In some examples, the user device 102 may display a third, different user-selectable link associated with a second, different search result. The second search result may include a third, different access URL that specifies a third state of a third software app. The third state may be associated with second, different one or more entities. The third user-selectable link may be configured to, upon being selected by a user input, cause the user device 102 to set the third software app into the third state. In these examples, the user input may specify the mathematical operation to be performed based on the first and second one or more entities and performing the mathematical operation may include performing the mathematical operation based on the first and second one or more entities. Also in these examples, the second state may be associated with at least one of the first and second one or more entities (e.g., any combination thereof).

In some examples, the user device 102 may receive a search query from the user and transmit the query to the search system 100. In these examples, the user device 102 may further, in response to transmitting the search query, receive the search result from the search system 100 and display the first user-selectable link. The user device 102 may still further receive another user input from the user and, in response to receiving the input, store one or more of the search result and the first user-selectable link in a local or remote data store. In these examples, to display the first user-selectable link in response to receiving the user input, the user device 102 may retrieve the stored search result and/or first user-selectable link from the data store. Alternatively, in other examples, the user device 102 may receive the search result from another one of the user device(s) 102 via a messaging app (e.g., a text, email, or other messaging app).

In some examples, the user input may include one or more user interactions with a user menu displayed at the user device 102. In these examples, the user interactions may be configured to select the first user-selectable link and select an indication of the mathematical operation. In other examples, the first user-selectable link may include a portion associated with the at least one of the one or more entities. In these examples, to select the first user-selectable link, the user interactions may be configured to select the portion.

In some examples, the mathematical operation may include one or more set operations, including any of a union operation, an intersection operation, a complement operation, a unary complement operation, a product operation, a function composition operation, a random operation, a first operation, and a last operation. In other examples, the mathematical operation may include one or more arithmetic operations, including any of an addition operation, a subtraction operation, a multiplication operation, and a division operation.

In some examples, the user device 102 may further determine whether the second software app includes the second state. For example, the user device 102 may perform a search for the second state in a data store associated with the second software app. The user device 102 may further perform a search for the second state in the second software app executing on the user device. The user device 102 may also query an app programming interface (API) associated with the second software app to determine whether the second software app includes the second state. Additionally, or alternatively, the user device 102 may query the search system 100 to determine whether the system 100 includes a state record that specifies the second state.

In some examples, the user device 102 may further display a graphical user interface (GUI) element indicating whether the second software app includes the second state. For example, the user device 102 may, in the event the second software app includes the second state, display a highlighted version of at least one of the first and second user-selectable links and, in the event the second software app does not include the second state, display an unmodified version of each of the first and second user-selectable links. The user device 102 may, in the event the second software app includes the second state, display an unmodified version of each of the first and second user-selectable links and, in the event the second software app does not include the second state, display a grayed out version of at least one of the first and second user-selectable links. The user device 102 may, in the event the second software app includes the second state, display a highlighted version of at least one of the first and second user-selectable links and, in the event the second software app does not include the second state, display a grayed out version of at least one of the first and second user-selectable links.

In some examples, the user device 102 may display the GUI element while receiving the user input and otherwise refrain from displaying the GUI element. In other examples, the user device 102 may display the GUI element after displaying the second user-selectable link and otherwise refraining from displaying the GUI element.

In some examples, the user device 102 may further generate the second access URL based on the first access URL and based on the at least one of the one or more entities. For example, the user device 102 may insert an indication of the at least one of the one or more entities into a field of the first access URL configured to include an indication of an entity. In other examples, the user device 102 may perform a search within the second software app based on the at least one of the one or more entities and, in response to performing the search, determine the second access URL. In still other examples, the user device 102 may query an API associated with the second software app based on the at least one of the one or more entities and, in response to querying the API, determine the second access URL. In still other examples, the user device 102 may generate a search query based on the first access URL and based on the at least one of the one or more entities, transmit the search query to the search system 100, and, in response to transmitting the query, receive a second, different search result from the system 100. In these examples, the second search result may include the second access URL.

In some examples, a user input may correspond to a finger contact input received at a capacitive touchscreen of the user device 102, a pressure input received at a pressure-sensitive display of the device 102, and/or a cursor selection input received via one or more of a computer mouse and a trackpad of the device 102. In other examples, a user input may correspond to one of a momentary input having a relatively short time duration and a prolonged input having a relatively longer time duration than that of the momentary input. In still other examples, a user input may correspond to one of a shallow input having a relatively small depression depth with respect to a pressure-sensitive display of the user device 102 and a deep input having a relatively large depression depth with respect to the display than that of the shallow input. In further examples, a user input may correspond to one of a first gesture with respect to a display of the user device 102 and a second, different gesture with respect to the display.

The search query may include text, numbers, and/or symbols, such as punctuation, entered into the user device 102 by the user. In some examples, the user may have entered the search query into a search field, or a so-called search "bar" or "box," of a search app executing on the user device 102. As described herein, the search app may be a native app dedicated to search, or a more general app, such as a web browser app. For example, the user may have entered the search query using a touchscreen keypad, a mechanical keypad, and/or via speech recognition techniques. In these examples, upon entering the search query, the user may have caused the search app to transmit the query to the search system 100 by further interacting with the app. In additional examples, the user may have entered the search query into the search app using various other techniques (e.g., so-called "autosuggest" or "autocomplete" techniques). In further examples, the search query may be generated or selected based on an interaction between the user and the user device 102, such as in response to the user selecting a link that corresponds to a predefined search query within an app executing on the device 102.

In some examples, the user device 102 may transmit additional data to the search system 100 along with the search query. The search query and the additional data may be referred to herein as a "query wrapper." The additional data may include geo-location data associated with the user device 102. The additional data may also include platform data for the user device 102, such as a type and/or a version, an operating system (OS), and/or a web browser app associated with the device 102. The additional data may further include an identity of the user, such as a username, partner specific data, and/or other data, such as indications of one or more native apps that are installed on the user device 102. The user device 102 may transmit the query wrapper to the search system 100. The search system 100 may receive the query wrapper from the user device 102 and use the search query and, optionally, the additional data included in the wrapper to generate the search results and provide the results to the device 102.

In some examples, the search system 100 may transmit the search results, including the access URLs, to the user device 102 with additional data. For example, the search system 100 may transmit display data, such as text and/or image data, which the user device 102 may use to generate the user-selectable links for the access URLs included in the search results. Each user-selectable link may include a portion of the display data that the user of the user device 102 may select (e.g., touch, press, or click on). Each user-selectable link may also be associated with one of the access URLs included in the search results, such that, when the user selects the link, the user device 102 sets a software app into a state specified by the access URL. The display data included in each user-selectable link may indicate the state of the software app associated with the link and/or the app itself (e.g., describe the state and/or the app textually and/or graphically). Example user-selectable links are illustrated in FIGS. 7A-7J.

Figure 2:
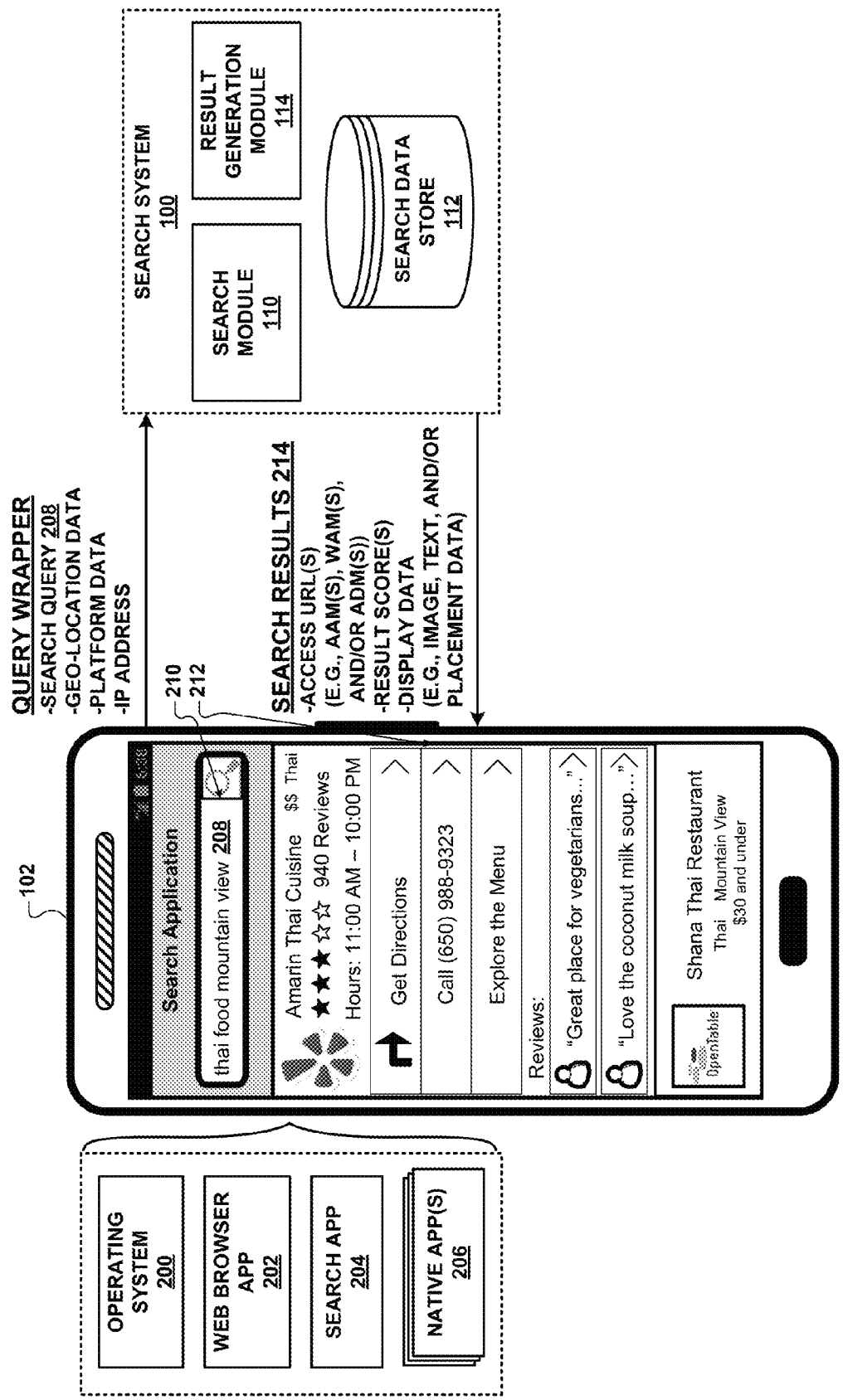
FIG. 2 illustrates an example user device in communication with a search system.

The user device(s) 102 may be any computing devices capable of providing search queries to the search system 100 and receiving search results from the system 100. The user device(s) 102 may include any of smartphones, and tablet, laptop, and desktop computing devices. The user device(s) 102 may also include any computing devices having other form factors, such as those included in vehicles, gaming devices, televisions, or other appliances (e.g., networked home automation devices and home appliances). The user device(s) 102 may use a variety of different operating systems or platforms (e.g., an OS 200, as shown in FIG. 2). For example, in the event that the user device 102 is a mobile device, the device 102 may operate using an OS such as ANDROID® by Google Inc., IOS® by Apple Inc., or WINDOWS PHONE® by Microsoft Corporation. Alternatively, in the event that the user device 102 is a laptop or desktop computing device, the device 102 may operate using an OS such as MICROSOFT WINDOWS® by Microsoft Corporation, MAC OS® by Apple Inc., or LINUX® (LINUX is the registered trademark of Linus Torvalds in the U.S. and other countries). The user device(s) 102 may also interact with the search system 100 using operating systems other than those described herein, whether presently available or developed in the future.

The user device(s) 102 may communicate with the search system 100 via the network 106. In general, the user device(s) 102 may communicate with the search system 100 using any app that can transmit search queries to the system 100 and receive search results from the system 100. In some examples, the user device(s) 102 may include an app that is dedicated to interfacing with the search system 100, such as an app dedicated to search (e.g., a search app 204, as further shown in FIG. 2). In other examples, the user device(s) 102 may communicate with the search system 100 using a more general app, such as a web browser app (e.g., a web browser app 202, as also shown in FIG. 2). An app included on a user device 102 to communicate with the search system 100 may display a graphical user interface (GUI) including a search field, bar, or box into which a user may enter search queries. For example, the user may enter the search queries using a touchscreen, a physical keyboard, a speech-to-text program, or another form of user input available on the user device 102. The app may be configured to transmit the search queries to the search system 100 (e.g., in response to additional user inputs).

In some examples, the user device 102 may use the same dedicated or more general app to display the search results received from the search system 100 to the user. For example, the user device 102 may display the search results via the GUI used to receive the search queries from the user and transmit the queries to the search system 100, as described herein. The GUI may display the search results to the user in a variety of different ways, depending on the information transmitted by the search system 100 to the user device 102 as part of the results. As previously described, the search results may include one or more access URLs, such as AAMs and/or WAMs, as well as display data, result scores, and/or other information used to generate user-selectable links for the access URLs. The GUI may display the search results to the user as a list of the user-selectable links, including text and/or image data. For example, the text and/or image data may describe and/or depict the states of the native or web-based apps specified by the access URLs (e.g., using alphanumeric strings, state "screenshots," and/or app "icons"). In some examples, the GUI may display the search results as the list of the user-selectable links arranged under the search field into which the user has entered a search query. For example, the GUI may arrange the user-selectable links by result scores associated with the links, e.g., with the access URLs for which the links are generated, or using other logic. The GUI may also group the user-selectable links by the corresponding software apps (e.g., using app headers).

The data source(s) 104 may be any sources of data that the search system 100 may use to generate and/or update the search data store 112. The search system 100 may use the data source(s) 104 to generate and/or update one or more databases, indices, tables, files, or other data structures, such as state records, included in the search data store 112. As a specific example, the search system 100 may generate new state records and/or update existing state records based on data retrieved from the data source(s) 104. For instance, the search system 100 may include one or more modules (not shown) that generate new state records and/or update existing state records based on the data. In some examples, some or all of the data included in the search data store 112, such as one or more state records, may be manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices. The data source(s) 104 may further include other websites, such as websites that include web logs, or blogs, app reviews, or other data related to apps. Additionally, the data source(s) 104 may include social networking sites, such as "FACEBOOK®" by Facebook Inc., including Facebook posts, and "TWITTER®" by Twitter Inc., including text from tweets. The data source(s) 104 may also include other types of data sources, which may have various types of content and update rates. In some examples, the search system 100 may retrieve data from the data source(s) 104, including any type of data related to apps and/or app functionality. The search system 100 may then generate one or more state records based on the data and store the records in the search data store 112. In other examples, some or all of the data, such as SI, included in the state records of the search data store 112 may be manually generated by a human operator. In further examples, the data included in the state records may be periodically updated over time such that the search system 100 is able to provide up-to-date, or current, search results in response to receiving search queries specified by users of the user device(s) 102 from the device(s) 102.

FIG. 2 illustrates an example of one of the user device(s) 102 in communication with the search system 100. Specifically, FIG. 2 depicts example interactions and data exchanged among the user device 102 and the search system 100. As shown in FIG. 2, the user device 102 may transmit a query wrapper to the search system 100. The query wrapper may include a search query 208, geo-location data, platform data, and/or other data (e.g., an IP address) associated with the user, the user device 102, and/or the query 208. For example, the user may have entered the search query 208 into a search field 210 of a GUI of a search app 204 included on the user device 102 and caused the app 204 to submit the query 208 to the search system 100 (e.g., as part of the query wrapper) by selecting a search button 212 of the GUI.

Upon receiving the query wrapper from the user device 102, the search system 100 may generate one or more search results 214 based on the search query 208. To generate the search results 214, the search system 100 may identify one or more state records included in the search data store 112 based on the search query 208. The search system 100 may further generate results scores for (e.g., rank) the identified state records. The search system 100 may then select one or more of the identified and ranked state records based on the corresponding results scores and select one or more access URLs (e.g., one or more AAMs and/or WAMs) from each selected record. Each access URL may specify a state of a software app. The state specified by each access URL may be associated with one or more entities. In some examples, the search system 100 may also select one or more ADMs (e.g., associated with the AAMs) from the selected state records. The search system 100 may then transmit the search results 214, each result 214 including the access URLs associated with one of the selected state records, to the user device 102 (e.g., along with one or more ADMs, display data, result scores, and/or other information selected from, associated with, and/or derived using the records).

In the example of FIG. 2, upon receiving the search results 214 from the search system 100, the user device 102 may display the results 214 to the user as one or more user-selectable links. For example, for a particular one of the search results 214, the user device 102 may generate a user-selectable link that is associated with (e.g., that includes) an access URL included in the result 214. As described herein, the access URL may specify a state of a native app (e.g., as in the case of an AAM) or web-based app (e.g., as in the case of a WAM). The state may be associated with one or more entities and one or more functions. The user-selectable link may be configured to, upon being selected (e.g., touched, pushed, or clicked on) by a user input, cause the user device 102 to set the native or web-based app (e.g., one of the native app(s) 206 or the web browser app 202) into the state (e.g., a native app screen, or a web page) specified by the first access URL (e.g., an AAM, or a WAM).

In some examples, the search result 214 may also include one or more ADMs that each indicate a location from which a native app referenced by one of the AAMs included in the result 214 may be downloaded. In these examples, the user device 102 may generate the user-selectable link such that the link is associated with (e.g., includes) one or more of the AAMs and corresponding ADMs. As a result, when the user selects the user-selectable link using the user input, the user device 102 may launch the native or web-based app and set the app into the state specified by the access URL included in the search result 214. In these examples, the user device 102 may first download the corresponding native app from a location specified by an ADM included in the user-selectable link and install the app on the device 102. Upon downloading and installing the native app, the user device 102 may launch the app and set the app into the state specified by the access URL (e.g., an AAM). In the example of FIG. 2, the user device 102 may display one or more other ones of the search results 214 as user-selectable links. Upon the user device 102 displaying the user-selectable links, the user may interact with the links (e.g., combine the links using Screen Apps) in the manner described herein.

In some examples, the user device 102 may generate the user-selectable links using display data included in the search results 214. For example, the display data may include any of text (e.g., describing a name of a software app and/or a state of the app) and image data (an icon, or screenshot, associated with the app and/or state). In this manner, the display data included in (e.g., used to generate) each of the user-selectable links may describe the software app and/or the state of the app associated with the link. In some examples, the user device 102 may generate a user-selectable link as a result of combining two or more other user-selectable links, as described herein, by combining the display data included in the corresponding search results 214.

In some examples, the user device 102 may further arrange (e.g., order, or rank) the user-selectable links as part of displaying the links to the user based on result scores associated with the links. As one example, the user device 102 may assign a particular user-selectable link a result score associated with the state record from which an access URL included in the link was selected. As another example, the user device 102 may generate a result score for a user-selectable link generated by combining two or more other user-selectable links using the result scores associated with the corresponding search results 214. The user device 102 may then order the user-selectable links based on the corresponding result scores (e.g., display higher-ranking links higher in a list of user-selectable links). Example search results 214 displayed to a user of a user device 102 as user-selectable links are described with reference to FIGS. 7A-7P.

FIG. 3A illustrates an example search system 100. As described herein, the search system 100 generates one or more search results 214 using a search query 208 received from one of the user device(s) 102 and data included in one or more state records of the search data store 112. Specifically, the search module 110 identifies one or more state records included in the search data store 112 based on the search query 208. In some examples, the search module 110 further ranks the identified state records. For example, the search module 110 may generate result scores for the identified state records. The search module 110 then transmits one or more state IDs 216 that indicate the identified and, in some examples, ranked state records to the result generation module 114. The result generation module 114 receives the state IDs 216 from the search module 110, identifies the corresponding state records in the search data store 112 using the IDs 216, and selects one or more access URLs from the records. The result generation module 114 then transmits the selected access URLs to the user device 102 as the search results 214. In some examples, the result generation module 114 may transmit additional information selected from, associated with, and/or generated for the identified state records to the user device 102 as part of the search results 214, such as display data, result scores, and other information.

FIG. 3B is a functional block diagram of an example search module 110. FIG. 3B also depicts an example search data store 112. The search module 110 of FIG. 3B includes a query analysis module 300, a consideration set generation module (hereinafter, "set generation module") 302, and a consideration set processing module (hereinafter, "set processing module") 304. The query analysis module 300 receives a search query 208 from one of the user device(s) 102 (e.g., as part of a query wrapper). Upon receiving the search query 208, the query analysis module 300 analyzes the query 208. For example, the query analysis module 300 may perform any of tokenization, filtering, stemming, synonymization, and stop word removal with respect to the search query 208. The set generation module 302 identifies one or more state records included in the search data store 112 based on the analyzed search query 208. For example, the set generation module 302 may identify the state records based on one or more text matches between one or more terms of the analyzed search query 208 and one or more terms of information included in, associated with, and/or generated for the records (e.g., SI and/or state IDs). In a specific example, the set generation module 302 may identify the state records using the analyzed search query 208 as an input to Lucene® information retrieval software developed by Apache Foundation. The identified state records may be referred to herein as a "consideration set." The set processing module 304 processes the consideration set (e.g., scores and selects a subset of the set). For example, the set processing module 304 may generate a result score for each state record included in the consideration set, thereby ranking the records, and select one or more records from the set having the largest one or more result scores. The set processing module 304 then transmits one or more state IDs 216 associated with the state records of the consideration set to the result generation module 114, as described herein. For example, the set processing module 304 may transmit one or more state IDs 216 included in the state records selected by the module 304 from the consideration set based on the corresponding result scores.

The information conveyed by the search results 214 may depend on the manner in which the set processing module 304 generates the result scores for the state records included in the consideration set. For example, for each state record, the corresponding result score may be generated based on various features associated with the record, such as relevance of the state of the software app specified by the record to the search query 208, popularity of the state, and/or other properties of the state, depending on the one or more parameters the set processing module 304 uses to score the record. The set processing module 304 may generate the result scores for the state records of the consideration set in a variety of different ways. In some examples, the set processing module 304 generates a result score for a particular one of the state records based on one or more scoring features. The scoring features may be associated with the state record, the search query 208, and/or other information. A state record scoring feature (hereinafter, "record scoring feature") may be based on any data associated with a state record. For example, a record scoring feature may be based on any data included in SI of a state record. An example record scoring feature may be a popularity score associated with a state record (e.g., generated based on user ratings of the corresponding software app or its state). A query scoring feature may include any data associated with a search query 208. For example, a query scoring feature may include any of a number of words in a search query 208, popularity of the query 208, and an expected frequency of the words in the query 208. A record-query scoring feature may include any data generated based on information associated with both a state record and a search query 208 that resulted in identification of the record by the set generation module 302. For example, a record-query scoring feature may include any parameters that indicate how well terms of a search query 208 match terms of SI and/or a state ID of a state record identified using the query 208. The set processing module 302 may generate a result score for a state record using any of the record, query, and record-query scoring features, and/or any other scoring feature not explicitly listed.

In some examples, to generate the result scores for the state records included in the consideration set, the set processing module 304 may use one or more machine-learned models configured to receive one or more of the record, query, and record-query scoring features (e.g., a supervised learning model, in some examples including regression). For example, the set processing module 304 may pair the search query 208 with each state record of the consideration set and calculate a vector of features for each (query, record) pair. The vector of features may include one or more of the record, query, and record-query scoring features. The set processing module 304 may then input the vector of features into a machine-learned relevance (MLR) model to calculate a result score for the corresponding state record (e.g., simultaneously based on the features). In some examples, the MLR model may include a set of decision trees (e.g., gradient-boosted decision trees). In other examples, the MLR model may be trained by a simple form of logistic regression. In still other examples, the machine-learned task described herein may be framed as a semi-supervised learning task, where a minority of training data is labeled with human-curated result scores and the rest of the data is used without such labels.

The result scores generated by the set processing module 304 for the state records included in the consideration set may be used in various different ways. In some examples, the result scores may be used to rank, or order, the access URLs included in the corresponding state records within a list. In these examples, a larger result score may indicate that the associated access URL specifying a particular state of a software app is more relevant to the search query 208, or to the user, than another access URL specifying a different state of a software app and associated with a smaller result score. In examples where the search results 214 are displayed as a list of multiple user-selectable links, those of the links including access URLs associated with larger result scores may be displayed closer to the top of the list (e.g., near the top of the screen). In these examples, the user-selectable links including access URLs having lower result scores may be displayed farther down the list, or off-screen, and accessed by scrolling down the screen.

Figure 4B:
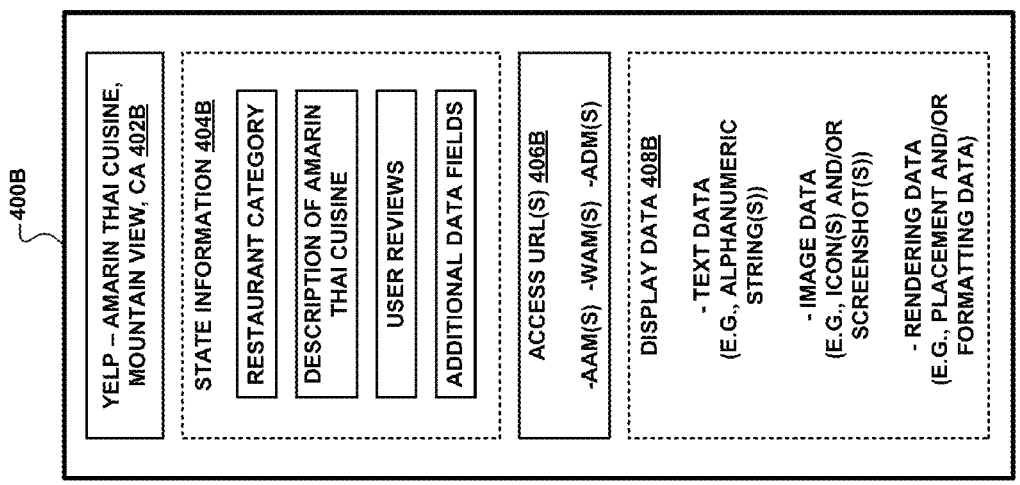
FIGS. 4A-4B illustrate example state records.
Figure 4A:
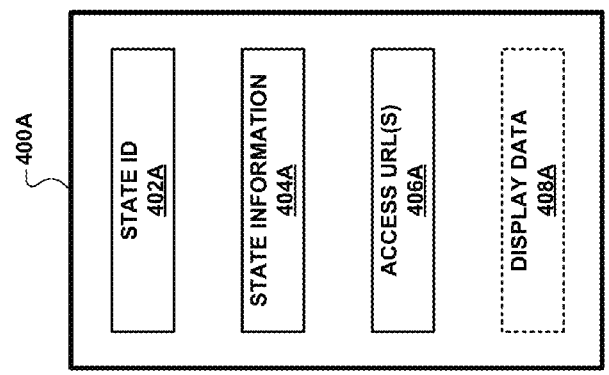

FIGS. 4A-4B illustrate example state records 400A, 400B that may be included in the search data store 112. FIG. 4A illustrates a general example of a state record 400A. The state record 400A of FIG. 4A includes information that specifies a state of a native or web-based app. As shown in FIG. 4A, the state record 400A includes a state ID 402A that uniquely identifies the record 400A among other state records included in the search data store 112. As also shown, the state record 400A includes SI 404A, which may include text, that describes the state specified by the record 400A and may be used to identify the record 400A in the search data store 112.

The state record 400A includes one or more access URLs 406A, which may include AAMs and/or WAMs, that enable a user device 102 to access the state specified by the record 400A in the native or web-based app. As one example, the access URL(s) 406A may include an AAM that references a native app and indicates one or more operations for the app, or a user device 102, to perform. The native app performing the operations may set the app into the state specified by the state record 400A. In response to a user selecting a user-selectable link that includes the AAM on a user device 102, the device 102 may launch the native app and set the app into the state using the AAM. In some examples, the access URL(s) 406 may include the AAM and an ADM. The ADM may specify a location, such as a digital distribution platform, where a user device 102 may download the native app referenced by the AAM (e.g., Google Play® by Google Inc.). In response to a user selecting a user-selectable link that includes the ADM on a user device 102, the device 102 may download the native app using the ADM and install the app. The user device 102 may then launch the native app and set the app into the state specified by the state record 400A using the AAM also included in the user-selectable link. In other examples, the access URL(s) 406A may include a WAM that references a web-based app and indicates one or more operations for the app, or a user device 102, to perform. The web-based app performing the operations may set the app into the state specified by the state record 400A. For example, the WAM may specify a state of the web-based app that is equivalent or analogous to the state of the native app specified by the AAM. In response to a user selecting a user-selectable link that includes the WAM on a user device 102, the device 102 may launch the web browser app 202 included on the device 102 and access the state using the WAM. In some examples, the WAM may include a resource ID that references a web resource (e.g., a particular page of the web-based app). For instance, the WAM may include a URL, such as a web address, used with HTTP. In these examples, upon the user selecting the user-selectable link including the WAM, the user device 102 may launch the web browser app 202 and retrieve the web resource referenced by the resource ID (e.g., access the page of the web-based app). As also shown, the state record 400A may include display data 408A. The display data 408A may include text describing the state of the native or web-based app specified by the state record 400A and/or the app itself. Additionally, or alternatively, the display data 408A may include image data, such as one or more icons or screenshots, associated with the state and/or the app.

In additional examples, the state record 400A may include information describing values of one or more metrics associated with a person, place, or thing described in the record 400A. Example metrics include popularity and/or user ratings of the place. For example, if the state record 400A describes a song, a metric associated with the song may be based on popularity and/or user ratings of the song. The information included in the state record 400A may also be based on measurements associated with the record 400A, such as how often the record 400A is retrieved during a search and how often user-selectable links generated for any of the access URL(s) 406A are selected by a user. The information may also indicate whether the state record 400A includes an AAM for a default state, or a deeper state, of a native app. In some examples, the search system 100, namely the set processing module 304, may use this information to generate a result score for the state record 400A, as described herein (e.g., upon identifying the record 400A and as part of ranking the record 400A among other identified state records).

FIG. 4B illustrates a specific example of a state record 400B that specifies a state of a native or web-based app "YELP®" by Yelp Inc. (hereinafter, "Yelp"). The state specified by the state record 400B corresponds to an entry in, such as a web page or a screen of, Yelp for the restaurant "Amarin Thai Cuisine" located in Mountain View, Calif. As shown in FIG. 4B, the state record 400B includes a state ID "Yelp—Amarin Thai Cuisine, Mountain View, Calif." 402B that uniquely identifies the record 400B among other state records included in the search data store 112. In other examples, the state ID 402B may be a numeric value, or have another representation (e.g., a machine-readable representation). As further shown, the state record 400B includes SI 404B that describes the state specified by the record 400B. The SI 404B describes a restaurant category, a description, user reviews, and/or any other information related to the Amarin Thai Cuisine restaurant associated with the state specified by the state record 400B. In some examples, the SI 404B may also describe one or more functions provided by the state, such as, e.g., "make a restaurant reservation," "read user reviews," and "write a user review." As still further shown, the state record 400B includes one or more access URLs 406B, such as one or more AAMs, WAMs, and/or ADMs, that enable a user device 102 to access the state specified by the record 400B in Yelp. As a specific example, the access URL(s) 406B may include an alphanumeric string "HTTP://WWW.YELP.COM/BIZ/AMARIN-THAI-CUISINE-MOUNTAIN-VIEW." As also shown, the state record 400B includes display data 408B. The display data 408B includes any of text data, such as one or more alphanumeric strings, image data, such as one or more icons and/or screenshots, and rendering data, such as placement and/or formatting data, associated with the entry in Yelp for the Amarin Thai Cuisine restaurant.

FIG. 5 is a flow diagram that illustrates an example method 500 for generating search results 214 based on a search query 208 using the search system 100. As shown in FIG. 5, in block 502, the search system 100 may initially receive a search query 208 specified by a user from one of the user device(s) 102 (e.g., as part of a query wrapper). In block 504, the search system 100 may optionally perform an analysis of the search query 208. For example, the query analysis module 300 may perform any of tokenization, filtering, stemming, synonymization, and stop word removal with respect to the search query 208. In some examples, the search system 100 may receive additional information from the user device 102 (e.g., as part of the query wrapper, or separately from the wrapper). For example, the additional information may include information associated with the user, information associated with the search query 208, and/or geo-location, platform, and IP address information associated with the user device 102.

In block 506, the set generation module 302 may identify a consideration set of one or more state records included in the search data store 112 based on the search query 208 (e.g., based on the analyzed search query 208). As described herein, each identified state record of the consideration set may include an access URL that specifies a state of a software app, such as a native or web-based app, and SI, such as text, that describes the state. As also described herein, the state may be associated with one or more functions, such as "write a user review," that may be performed based on one or more parameters, such as an entity (e.g., a business).

In blocks 508-510, the set processing module 304 may optionally process the consideration set of state records. Specifically, in block 508, the set processing module 304 may generate one or more result scores for the state records included in the consideration set (e.g., generate a result score for each record). In block 510, the set processing module 304 may select one or more state records from the consideration set based on the one or more result scores associated with the records (e.g., select a subset of the records included in the set). For example, the set processing module 304 may select one or more state records included in the consideration set that are associated with the largest one or more result scores.

In block 512, the result generation module 114 may select one or more access URLs from the state records included in the consideration set. For example, the result generation module 114 may select the access URLs from the state records that the set processing module 304 selects from the consideration set based on the corresponding result scores (e.g., select one access URL from each selected record). In some examples, the result generation module 114 may select additional information included in, associated with, and/or generated for the state records of the consideration set, such as display data, result scores, and/or other information.

In block 514, the result generation module 114 may generate one or more search results 214 that include the selected access URLs. For example, the result generation module 114 may generate the search results 214 such that each result 214 includes one of the access URLs and, optionally, other information included in, associated with, and/or generated for the corresponding state record. In block 516, the result generation module 114 may transmit the search results 214, including the access URLs and any other information, to the user device 102.

FIG. 6 is a flow diagram that illustrates an example method 600 for generating search results 214 based on a search query 208 using one of the user device(s) 102. In block 602, one of the user device(s) 102 may initially receive a search query 208 from a user of the device 102. As described herein, the user device 102 may receive the search query 208 from the user via a search app 204 executing on the device 102. In block 604, the user device 102 may transmit the search query 208 to the search system 100. As also described herein, the user device 102 may transmit the search query 208 to the search system 100 in response to receiving an input from the user via the search app 204. In this example, the search system 100 may receive the search query 208 from the user device 102 and generate one or more search results 214 using the query 208. The search results 214 may include one or more access URLs, such as AAMs, WAMs, and/or ADMs, display data, result scores, and/or other information. The search system 100 may transmit the search results 214 to the user device 102.

In block 606, the user device 102 may receive the search results 214, including the access URLs, from the search system 100 in response to transmitting the search query 208 to the system 100. In block 608, the user device 102 may display the access URLs to the user as one or more user-selectable links. As described herein, the user device 102 may display the access URLs as the user-selectable links using the search app 204. For example, the user device 102 may generate each user-selectable link to include one or more of the access URLs and, e.g., the corresponding display data and/or other information also received as part of the search results 214. In some examples, the user device 102 may further rank, or arrange within an order, the user-selectable links including the access URLs based on the corresponding result scores also received along with the search results 214. In some examples, the user device 102 may display the user-selectable links as one or more so-called "cards" that include the links and various other information, such as text, image, and/or rendering data, enclosed in a visual boundary.

Figure 7B:
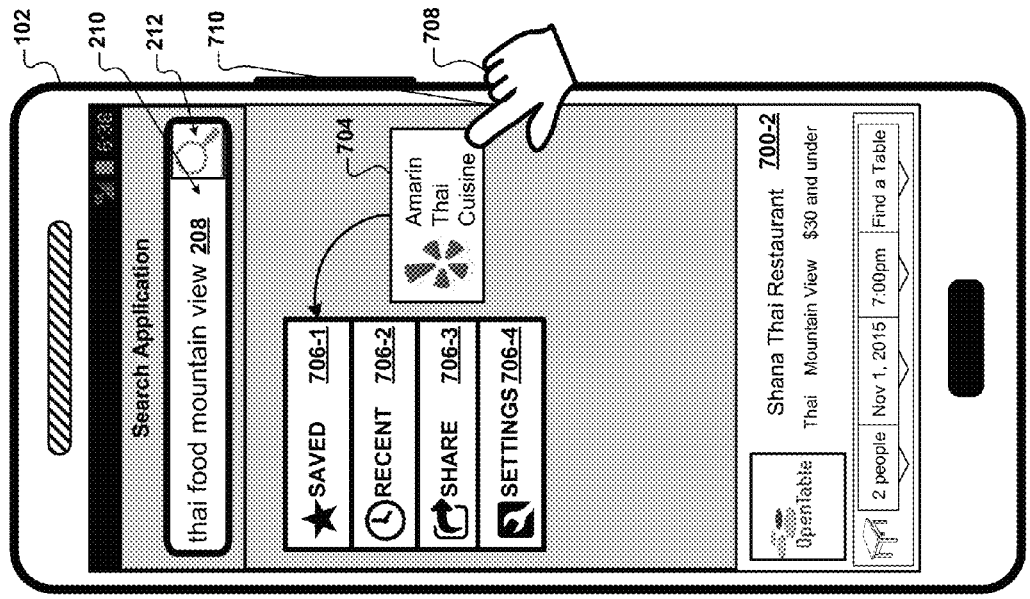
FIGS. 7A-7P depict example graphical user interfaces (GUIs) that may be generated on a user device according to the present disclosure.
Figure 7A:
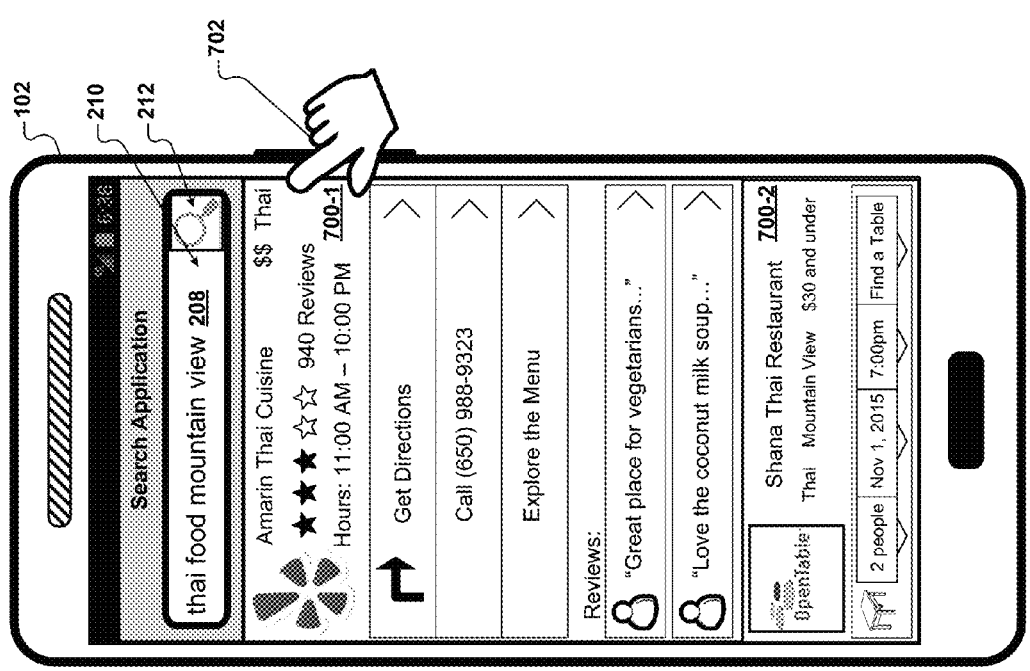

FIGS. 7A-7P depict example GUIs that may be generated on one of the user device(s) 102 according to this disclosure. The examples of FIGS. 7A-7D depict the user device 102 performing searches for states of software apps using search queries 208 specified by a user of the device 102. FIGS. 7E-7P depict the user device 102 using search results 214 generated as part of the searches as inputs into a Screen App configured to combine the results 214 using any of a variety of techniques. As shown in FIGS. 7A-7D, the user may initially enter a search query 208 into a search field 210 of a GUI of a search app 204 executing on the user device 102. As also shown, the user may then interact with a search button 212 of the GUI to cause the search app 204 to transmit the search query 208 to the search system 100. The search system 100 may receive the search query 208 from the user device 102 and generate search results 214 that specify states of software apps (e.g., native or web-based apps) based on the query 208. As described herein, each search result 214 may include an access URL (e.g., an AAM or a WAM) that specifies a state of a software app. As also described herein, the state may be associated with one or more entities. To generate the search results 214, the search system 100 may identify state records included in the search data store 112 based on the search query 208 and rank the identified records. The search system 100 may select one or more access URLs from the identified and ranked, state records. The search system 100 may then transmit the search results 214, including the access URLs, to the user device 102. The user device 102 may receive the search results 214 from the search system 100 in response to transmitting the search query 208 to the system 100 and display the results 214 to the user as one or more user-selectable links.

With reference to FIG. 7A, the user device 102 (e.g., the search app 204) may display a particular one of the search results 214 to the user as a user-selectable link 700-1 within a GUI. For example, the user device 102 may generate the user-selectable link 700-1 using display (e.g., text and/or image) data received from the search system 100 as part of the search result 214. As described herein, the search result 214 may include an access URL that specifies a first state of a first software app. As also described herein, the first state may be associated with one or more entities. Accordingly, the user-selectable link 700-1 may be configured to, upon being selected by the user, cause the user device 102 to set the first software app into the first state (not shown). As shown in FIG. 7A, the first state specified by the access URL included in the search result 214 corresponds to a state of Yelp® by Yelp Inc. (hereinafter, "Yelp"). Specifically, the first state of Yelp depicted in FIG. 7A corresponds to an entry in Yelp for a particular Amarin Thai restaurant located in Mountain View, Calif. In this example, a function associated with the first state may be "read user reviews." Also in this example, an entity associated with the first state may be a name of a business corresponding to this particular Amarin Thai restaurant. In other words, the first state may be associated with the function of reading user reviews for the Amarin Thai restaurant. In some examples, the first state may be further associated with one or more additional functions (e.g., "write a user review" or "view a menu") performed based on the same or another entity. In other examples, the search result 214 may be another type of search result that is associated with the entity corresponding to the Amarin Thai restaurant. For example, the search result 214 may correspond to any of a web page, a document, a media file (e.g., an image, an audio file, or a video file), or a native app that references the entity.

As shown in FIG. 7A, the user device 102 may display the user-selectable link 700-1 to the user in the form of a so-called "card" that includes the link 700-1 and other information within a visual boundary. In some examples, the other information included in the card may correspond to one or more additional access URLs (e.g., one or more additional user-selectable links generated based on the URLs) and/or other content (e.g., display data) received as part of the search result 214 from the search system 100. As also shown, in some examples, the user device 102 (e.g., the search app 204) may also receive one or more additional search results 214 from the search system 100 and display the results 214 to the user as one or more additional user-selectable links (e.g., the user-selectable link 700-2) within the same GUI.

In the example of FIG. 7A, the entity corresponding to the Amarin Thai restaurant is specified by the user-selectable link 700-1. For example, the entity may be associated with (e.g., embedded in) the link. In other examples (not shown), upon displaying the search result 214 as the user-selectable link 700-1, the entity may not be initially specified by the link 700-1. In these examples, after the user device 102 displays the user-selectable link 700-1 to the user, the user may specify the entity by providing a user input indicating the entity to the device 102. The user device 102 may then modify the user-selectable link 700-1 to specify the entity.

As shown in FIG. 7A, after displaying the user-selectable link 700-1 to the user, the user device 102 may receive a user input 702 from the user. As shown in FIGS. 7A-7B, the user input 702, e.g., in conjunction with one or more additional user inputs, may be configured to navigate the user device 102 (e.g., the search app 204) to a menu that enables the user to store the search result 214 and/or the user-selectable link 700-1. For example, as shown in FIG. 7A, the user input 702 (e.g., a prolonged touch, push, or click, or a deep push) may select the user-selectable link 700-1. As shown in FIG. 7B, upon the user input 702 selecting the user-selectable link 700-1, user device 102 (e.g., the search app 204) may display a minimized version 704 (e.g., an icon) of the user-selectable link 700-1 and the menu. Upon displaying the minimized version 704 of the user-selectable link 700-1, the user device 102 may receive another user input 708, which may be a continuation of the user input 702, from the user selecting the minimized version 704. As further shown, the user input 708 may be configured to drag the minimized version 704 of the user-selectable link 700-1 to a menu user-selectable link 706-1 included in the menu along a trajectory 710 and drop the link 700-1 into the menu link 706-1. As further shown, in response to receiving the user input 708, the user device 102 (e.g., the search app 204) may store the search result 214 and/or the user-selectable link 700-1 (e.g., locally, or at a remote data store). As shown in FIG. 7B, the menu may include additional menu user-selectable links 706-2 . . . 706-4 that, upon being selected, may enable the user to retrieve the stored search result 214 and/or the user-selectable link 700-1.

Figure 7D:
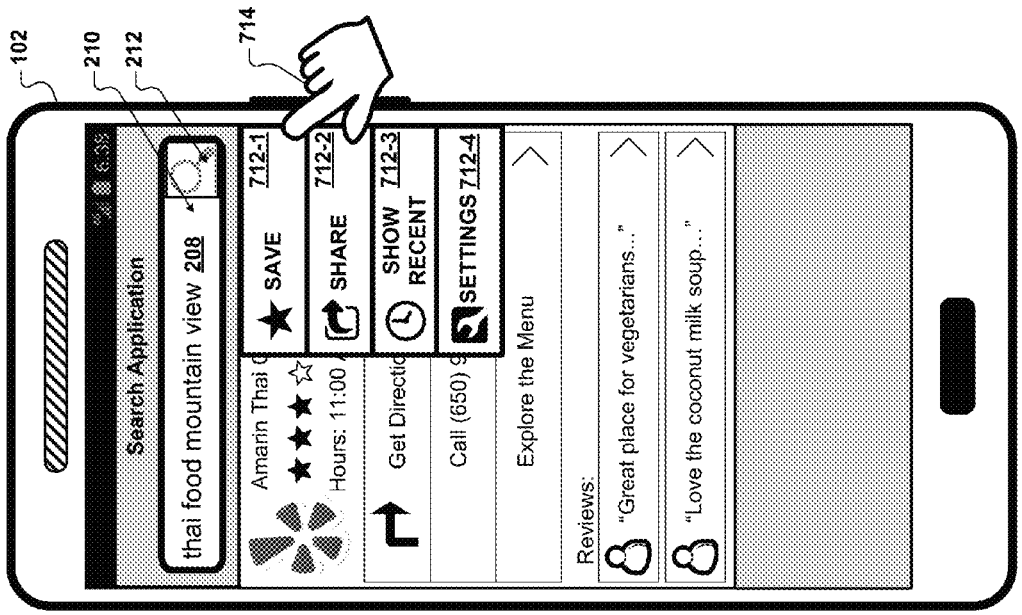
Figure 7C:
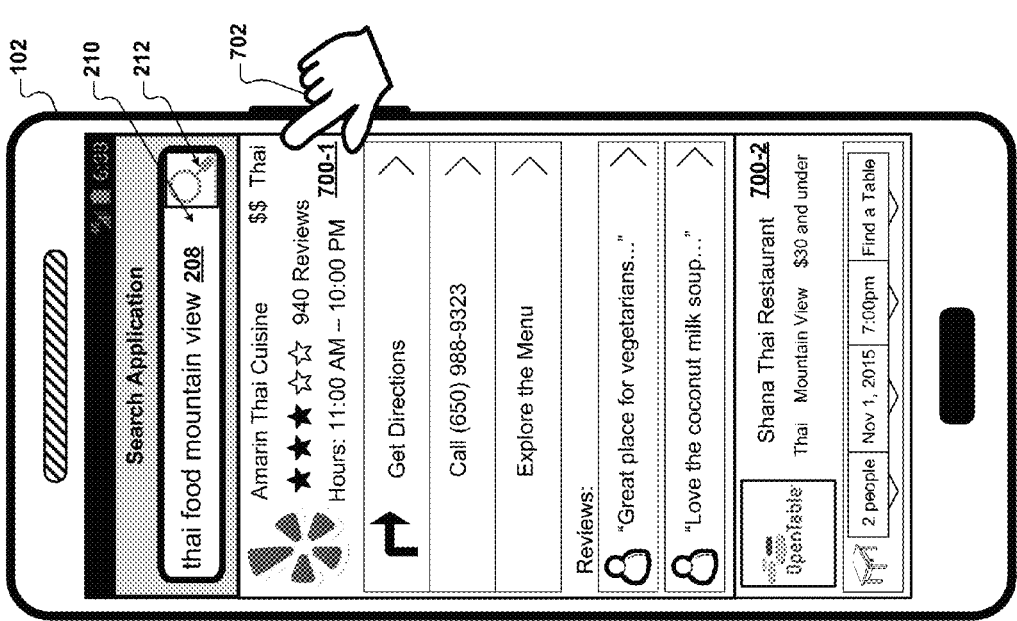

FIG. 7C is analogous to FIG. 7A. With reference to FIG. 7D, upon the user input 702 selecting the user-selectable link 700-1, user device 102 (e.g., the search app 204) may display a menu that is similar to the menu described with reference to FIGS. 7A-7B. As also shown, upon displaying the menu, the user device 102 may receive another user input 714, which may be a continuation of the user input 702, from the user selecting a menu user-selectable link 712-1 included in the menu. As further shown, in response to receiving the user input 714, the user device 102 (e.g., the search app 204) may store the search result 214 and/or the user-selectable link 700-1 (e.g., locally, or at a remote data store). As shown in FIG. 7D, the menu may include additional menu user-selectable links 712-2 . . . 712-4 that, upon being selected, may enable the user to retrieve the stored search result 214 and/or the user-selectable link 700-1.

Figure 7G:
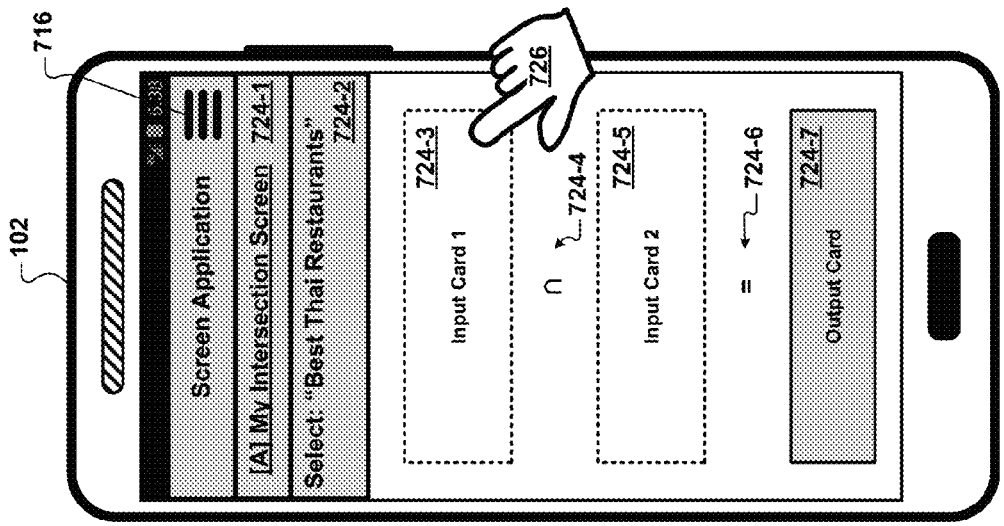
Figure 7F:
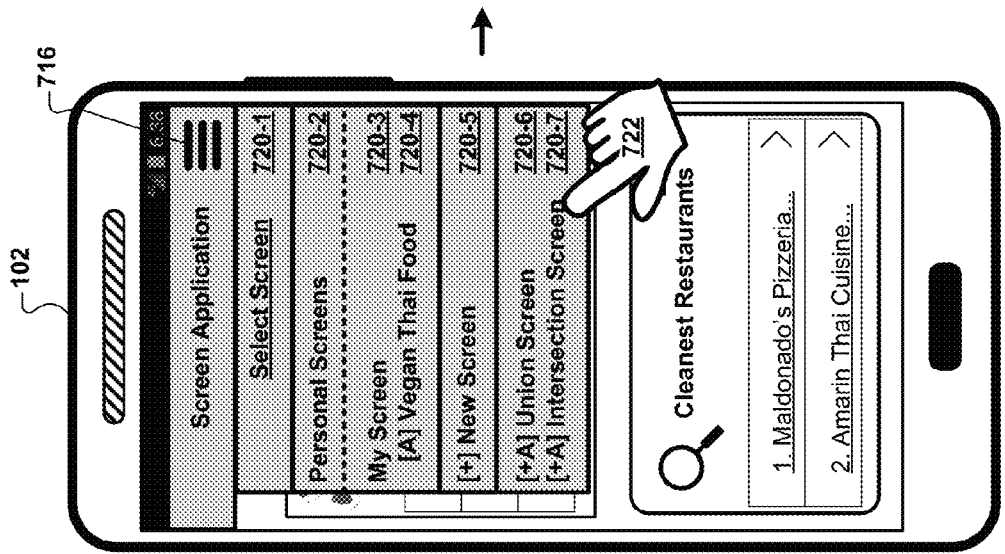
Figure 7E:
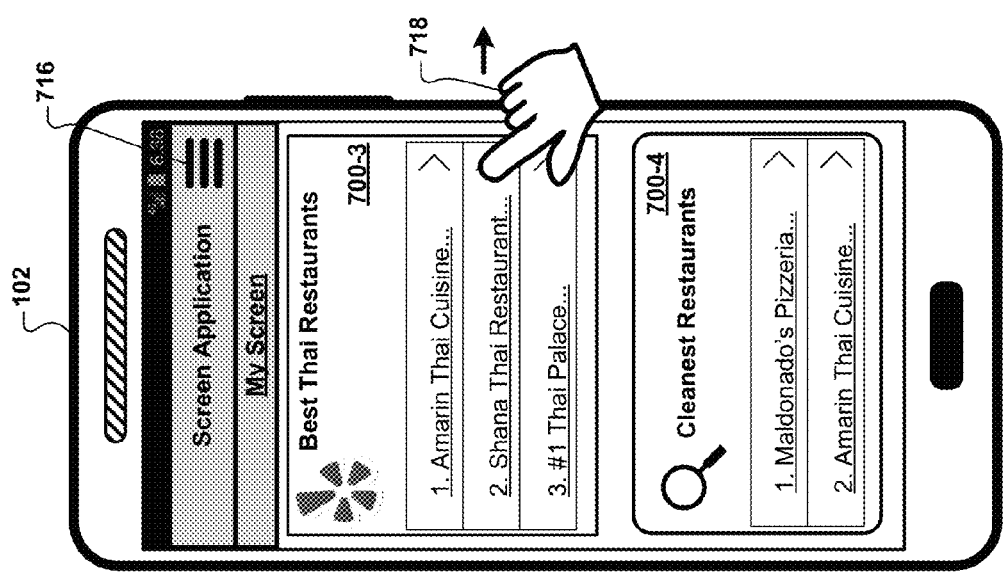

FIGS. 7E-7P illustrate examples in which the user device 102 uses previously stored search results 214 and/or user-selectable links as input parameters for screen apps. As shown in FIG. 7E, the user device 102 may display first and second user-selectable link 700-1, 700-2 within a GUI, or a so-called "screen," of a software app installed on the device 102 (e.g., any of the native app(s) 206). A screen, as used herein, may refer to a GUI that displays one or more search results 214 as one or more user-selectable links. The first user-selectable link 700-1 corresponds to an entry in Yelp for the best Thai restaurants and includes multiple entities each associated with a particular Thai restaurant. The second user-selectable link 700-2 corresponds to an entry in another native or web-based app for the cleanest restaurants and includes multiple entities each associated with a particular restaurant. In some examples, an entity associated with a user-selectable link may include any of a name of a business name or a business franchise, a geographic location, or another type of parameter. As also shown, the user device 102 may receive a user input 718 (e.g., a prolonged touch, push, or click, or a deep push) from the user selecting the first user-selectable link 700-1. As shown in FIGS. 7E-7G, the user input 718, e.g., in conjunction with one or more additional user inputs, may be configured to navigate the user device 102 to a menu that enables the user to specify the first user-selectable link 700-1 (e.g., the associated entities) as an input for a so-called "screen app" of the software app associated with the screen. A screen app, as used herein, may refer to a screen that includes one or more user-selectable links and performs any number of operations (e.g., using logic, or other operators) based on the links (e.g., based on entities associated with the links). As a result, the screen app may generate one or more additional user-selectable links that correspond to various combinations of the user-selectable links (e.g., of the associated entities) included in the screen. As shown in FIG. 7E, upon the user input 718 selecting the first user-selectable link 700-1, the user device 102 invokes the menu.

Figure 7J:
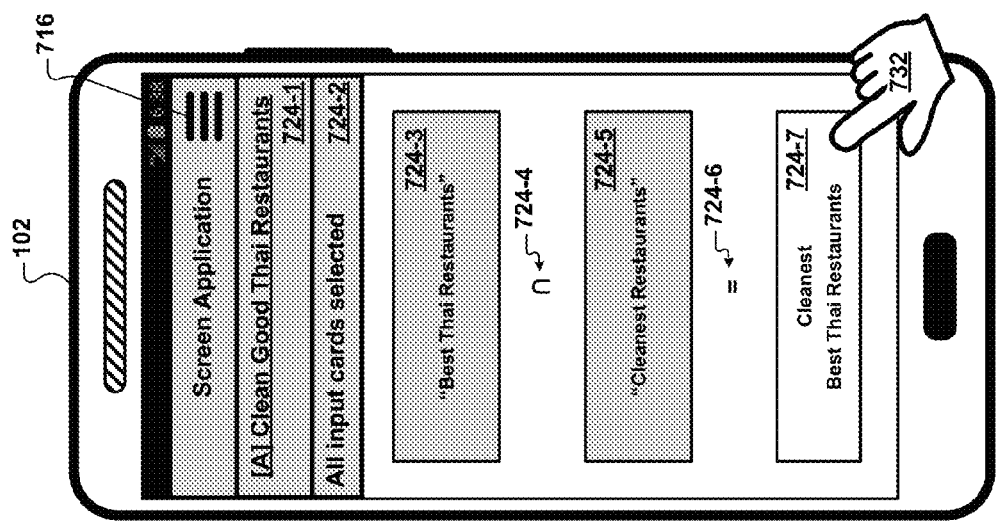
Figure 7I:
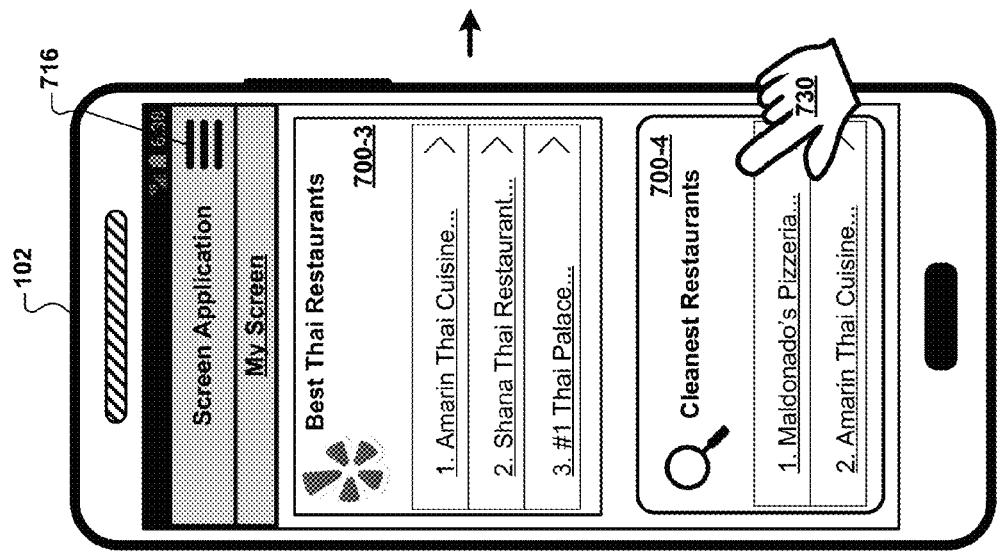
Figure 7H:
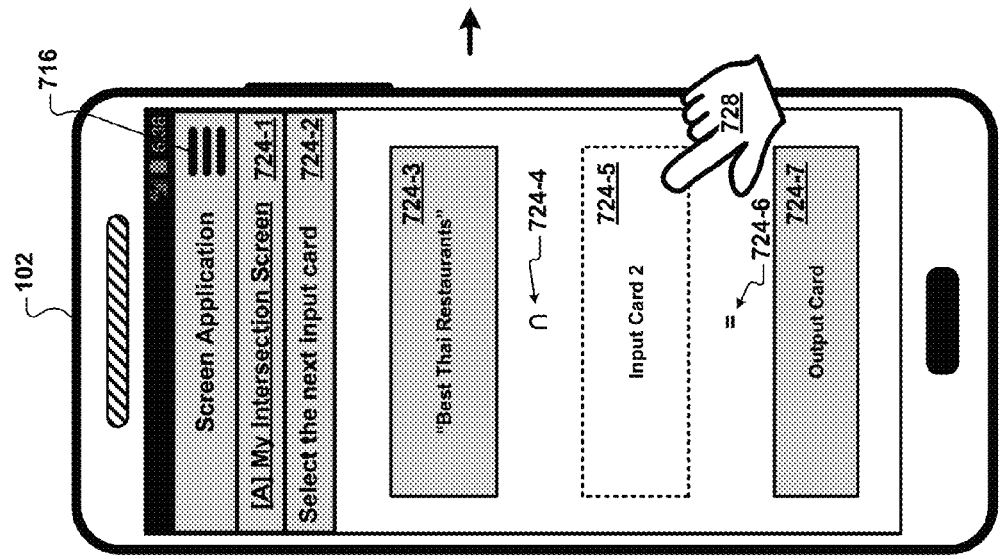

As shown in FIG. 7F, upon being invoked, the menu may display menu user-selectable links 720-1 . . . 720-4 one of which, namely link 720-4, upon being selected, causes the user device 102 to open a screen app corresponding to an intersection logic operator ("∩"). As also shown, after displaying the menu to the user, the user device 102 may receive another user input 722 from the user selecting the menu user-selectable link 720-4. As shown in FIG. 7G, in response to receiving the user input 722, the user device 102 may display the screen app associated with the intersection logic operator. As also shown, the screen app may include a first input field 724-2 configured to, upon being selected by a user input, specify the first user-selectable link 700-1 as a first input for the screen app (e.g., for the intersection logic operator). As further shown, after displaying the screen app to the user, the user device 102 may receive another user input 726 from the user selecting the first input field 724-2. As shown in FIG. 7H, in response to receiving the user input 726, the user device 102 may specify the first user-selectable link 700-1 as the first input for the screen app. As also shown, the user device 102 may receive another user input 728 from the user selecting a second input field 724-3 included in the screen app. The second input field 724-3 may be configured to, upon being selected by a user input, specify another user-selectable link (e.g., the second user-selectable link 700-2) as a second input for the screen app. As shown in FIG. 7I, in response to receiving the user input 728, the user device 102 may display the screen including the first and second user-selectable links 700-1, 700-2 shown in FIG. 7E. As also shown, the user device 102 may receive another user input 730 from the user selecting the second user-selectable link 700-2. As shown in FIG. 7J, in response to receiving the user input 730, the user device 102 may specify the second user-selectable link 700-2 as the second input for the screen app. As also shown, the user device 102 (e.g., the screen app) may then generate and display a third user-selectable link 724-4 that corresponds to a logical intersection of the entities associated with the first and second user-selectable links 700-1, 700-2. Specifically, as shown, the third user-selectable link 724-4 may be associated with those of the restaurants that are specified by both the first and second user-selectable links 700-1, 700-2 (e.g., that are both "best" and "cleanest" restaurants). As further shown, the user device 102 may receive another user input 732 from the user selecting the third user-selectable link 724-4, upon which the device 102 may launch a software app and set the app into a state that displays the entities associated with the link 724-4. As one example, the user device 102 may launch Yelp and set Yelp into a state that displays the best and cleanest restaurants. As another example, the user device 102 may launch the other software app and set the app into a state that displays the best and cleanest restaurants. In still other examples, the user device 102 may display a listing of the best and cleanest restaurants within another screen (e.g., another GUI) of the software app associated with the screen app.

FIGS. 7K-7M depict an example in which the user uses the third user-selectable link 724-4 and another screen app corresponding to a so-called "random" operator to generate a fourth user-selectable 724-8, in a similar manner as described with reference to FIGS. 7E-7J. FIGS. 7K-7L include some of the same or similar elements and user interactions as FIGS. 7E-7F. The fourth user-selectable link 724-8 shown in FIG. 7M may be associated with a particular, randomly selected one of the best and cleanest restaurants specified by the third user-selectable link 724-7. In other words, the screen app of the example of FIGS. 7K-7M may generate the fourth user-selectable link 724-8 by randomly selecting one of the entities associated with the third user-selectable link 724-7.

FIGS. 7N-7P depict additional examples in which the user uses various existing user-selectable links and a screen app to generate new user-selectable links associated with a wide variety of entities and functionality. The example of FIGS. 7N-7P illustrates a dynamic screen app that includes various different types of input parameter fields (e.g., existing user-selectable links), generated user-selectable links, and associated logic. The screen app of FIGS. 7N-7P includes user-selectable links specifying states of various software apps that are associated with various parameters, including entities, geographic locations, and other data.

As described herein, the screen app may perform any of a number of actions, or operations, with respect to one or more user-selectable links (e.g., the corresponding search results 214). For example, the search app may perform any of "A': Unary Complement," "A∪B: Union," "A∩B: Intersection" (as previously described), "A−B: Complement," "A×B: Product," "A∘B: Composition: A(B(x))," "RAND(A)=>a," where "a∈A" is a random item, "FIRST(A)=>a," where "a∈A" is the first item, and "LAST(A)=>a," where "a∈A" is the last item. In further examples, in the event an input field, or "slot," within a screen app is unable to be specified by the user, e.g., due to a type or operational constraint associated with the entity corresponding to the first and/or second user-selectable links 700-1, 700-2, the field may be greyed out or otherwise obscured to indicate that the field is unavailable. In other examples, the user may be able to change the ordering of one or more of the first and second user-selectable inks 700-1, 700-2. In still other examples, the user may be able to edit one or more of the first and second user-selectable inks 700-1, 700-2 by pressing an edit button and changing a name and/or reconfiguring the corresponding link 700-1, 700-2.

In additional examples, to store a particular search result 214, the user may perform a so-called "swipe" of the corresponding user-selectable link (e.g., card) in any direction relative to a screen of the user device 102. Additionally, or alternatively, the user may perform a gesture with respect to the screen. In response to the user's swipe or gesture, the user device 102 (e.g., the search app 204) may automatically store the user-selectable link (e.g., the search result 214). Alternatively, in response to the user's swipe or gesture, the user device 102 (e.g., the search app 204) may display the menu described with reference to FIGS. 7A-7D that enables the user to store the user-selectable link (e.g., the search result 214) using one or more additional user inputs. In some examples, as shown in FIGS. 7A-7D, the menu may include one or more additional user-selectable links configured to, upon being selected by user inputs, enable the user to retrieve recently viewed and/or shared user-selectable links (e.g., the associated search results 214). In still other examples, the user may store the search result 214 using other techniques.

In some examples, the stored user-selectable links may be selected by the user using so-called "two-finger" contact inputs that enable the user to select and drag the links using two fingers of the user's hand to another location (e.g., to an input field). In other examples, the user (e.g., the user device 102) may receive a particular user-selectable link (e.g., the corresponding search result 214) as part of an advertisement or a recommendation from another user (e.g., via an e-mail or text message from the other user).

In general, according to the techniques of this disclosure, the result of combining two or more user-selectable links in the manner described herein may vary depending on the corresponding search results 214 (e.g., the cards) that are combined. In some examples, the user may combine the first and second user-selectable links to generate the third user-selectable link in the manner described herein. The user may then combine the third user-selectable link with another user-selectable link and, e.g., repeat the process, as described herein.

In further examples, the search system 100 may generate one or more additional search results (not shown) that include content that does not specify states of software apps (e.g., content related to native apps, websites, documents, and/or media files). In these examples, the search system 100 may identify one or more records (e.g., app records, or other data structures) stored in a data store that include the content based on the search query 208, in a similar manner as described herein. The search system 100 may then select the content from the identified records and transmit the content to the user device 102 with the search results 214.

Figure 8A:
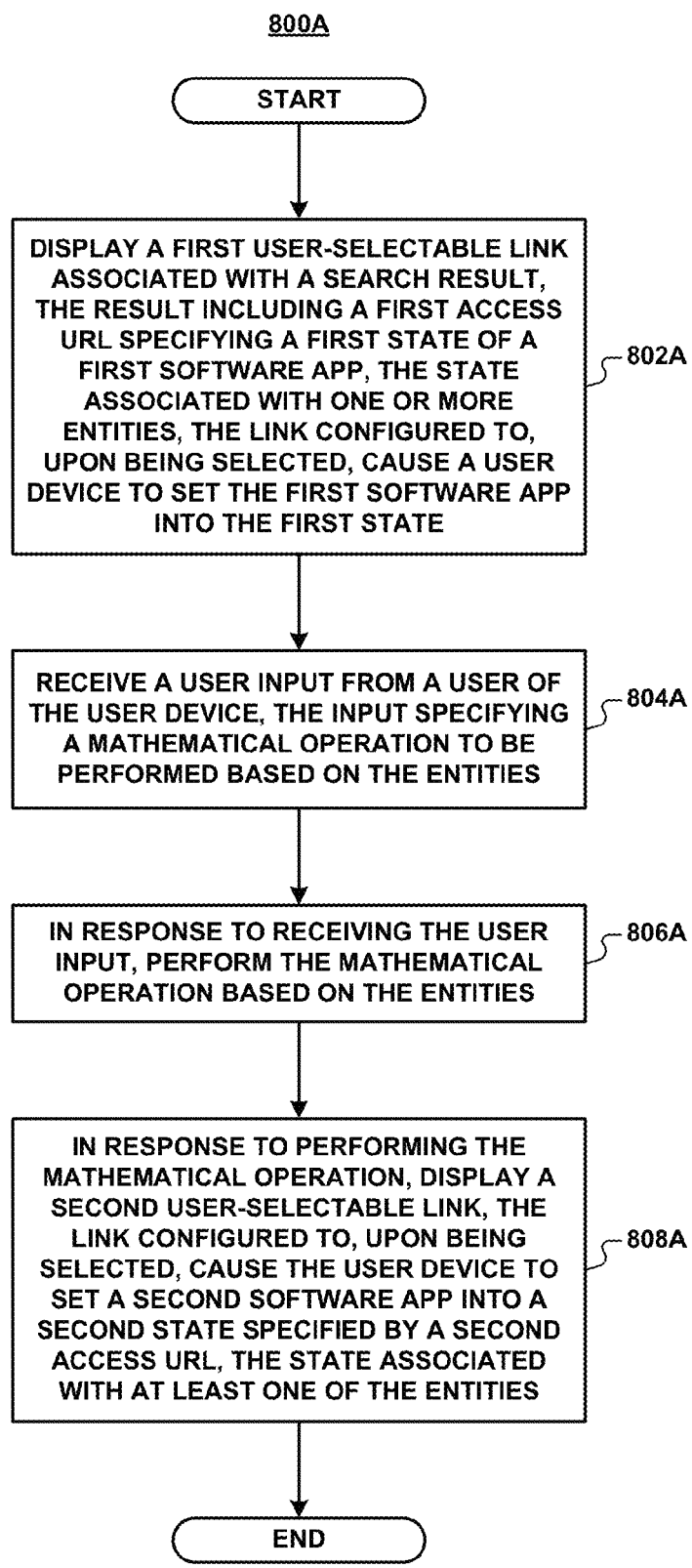
FIGS. 8A-8C are flow diagrams that illustrate example methods for combining search results to generate customized software app functions at a user device.

FIG. 8A is a flow diagram that illustrates an example method 800A for manipulating one or more search results 214 to generate a customized software app function using one of the user device(s) 102. As shown in FIG. 8A, in block 802A, one of the user device(s) 102 may initially display a first user-selectable link associated with a search result 214. As described herein, the search result 214 may include a first access URL that specifies a first state of a first software app (e.g., a native or web-based app). In this example, the first state may be associated with one or more entities, such as any of a name of a specific business or a business franchise, a geographic location, a name of a product or service, and another entity type. As further described herein, the search result 214 may include other information associated with the first access URL, such as display data, a result score, and/or other information. As also described herein, the first user-selectable link may be configured to, upon being selected by a user input, cause the user device 102 to set the first software app into the first state. For example, the user device 102 may generate the first user-selectable link such that the link includes the first access URL and, e.g., the corresponding display data and/or other information associated with the search result 214. The user device 102 may then display the first user-selectable link. In some examples, the user device 102 may also display one or more additional user-selectable links associated with one or more additional search results 214. In these examples, the user device 102 may further rank, or arrange in an order, the displayed user-selectable links based on the corresponding result scores. As a specific example, the user device 102 may arrange the displayed user-selectable links in an order of decreasing result scores.

In block 804A, the user device 102 may receive a user input from the user. In this example, the user input may specify a mathematical operation to be performed based on the entities associated with the first state of the first software app. For example, the user input may include one or more user interactions by the user with a user menu displayed at the user device 102. In this example, the user interactions may be configured to select the first user-selectable link and specify the mathematical operation (e.g., by navigating the user through the user menu).

In block 806A, in response to receiving the user input, the user device 102 may perform the mathematical operation based on the entities associated with the first state of the first software app. As described herein, in some examples, the user device 102 may also perform the mathematical operation based one or more additional entities associated with another state of another software app. As also described herein, the other state may be specified by another access URL included in another search result 214 displayed as another user-selectable link.

In block 808A, in response to performing the mathematical operation, the user device 102 may display a second user-selectable link. As described herein, the second user-selectable link may be configured to, upon being selected by a user input, cause the user device 102 to set a second software app into a second state specified by a second access URL. As also described herein, the second state may be associated with at least one of the entities associated with the first state of the first software app (e.g., a subset of the entities).

In some examples, the user device 102 may retrieve the search result 214 and/or the first user-selectable link from an internal memory location and/or a remote data store in response to receiving another user input. For example, as described with reference to FIGS. 8B-8C, the user device 102 may have previously stored the search result 214 and/or the first user-selectable link in the internal memory location or remote data store for later retrieval upon receiving another user input from the user. In these examples, the user device 102 may have received the search result 214 from the search system 100 in response to a search query 208, or from another user device via a messaging app (e.g., a text messaging, email, or social networking app).

In some examples, the user device 102 may generate the second access URL based on the at least one of the entities associated with the first state of the first software app. For example, the user device 102 may insert an indication of the at least one of the entities into a field, or a placeholder, of a template access URL associated with the second software app that is configured to include indications of entities. As a specific example, the user device 102 may generate the second access URL "HTTP://WWW.YELP.COM/BIZ/AMARIN-THAI-CUISINE-MOUNTAIN-VIEW" by inserting one or more terms associated with the entity "Amarin Thai Cuisine Mountain View Calif." into the template access URL "HTTP://WWW.YELP.COM/BIZ/[ ]." In this example, the user device 102 may insert the terms into the template access URL using one or more rules and/or guidelines (e.g., permitted terms and required formatting) specified by a developer of the second software app (e.g., Yelp).

As another example, the user device 102 may generate a search query 208 based on the at least one of the entities and an indication of the second software app. For example, the user device 102 may generate the search query 208 using one or more terms that describe the at least one of the entities and the second software app (e.g., a name of the app). The user device 102 may then transmit the search query 208 to the search system 100 and, in response to transmitting the modified version, receive another search result 214 from the system 100. In this example, the other search result 214 may include the second access URL. As a specific example, the user device 102 may generate a search query 208 "Yelp Amarin Thai Cuisine" by incorporating one or more terms associated with an entity "Amarin Thai Cuisine Mountain View Calif." and an indication of the second software app (e.g., Yelp) into the query 208. In this example, the user device 102 may transmit the search query 208 to the search system 100 and receive the other search result 214 from the system 100 that includes the second access URL "HTTP://WWW.YELP.COM/BIZ/AMARIN-THAI-CUISINE-MOUNTAIN-VIEW."

Figure 8B:
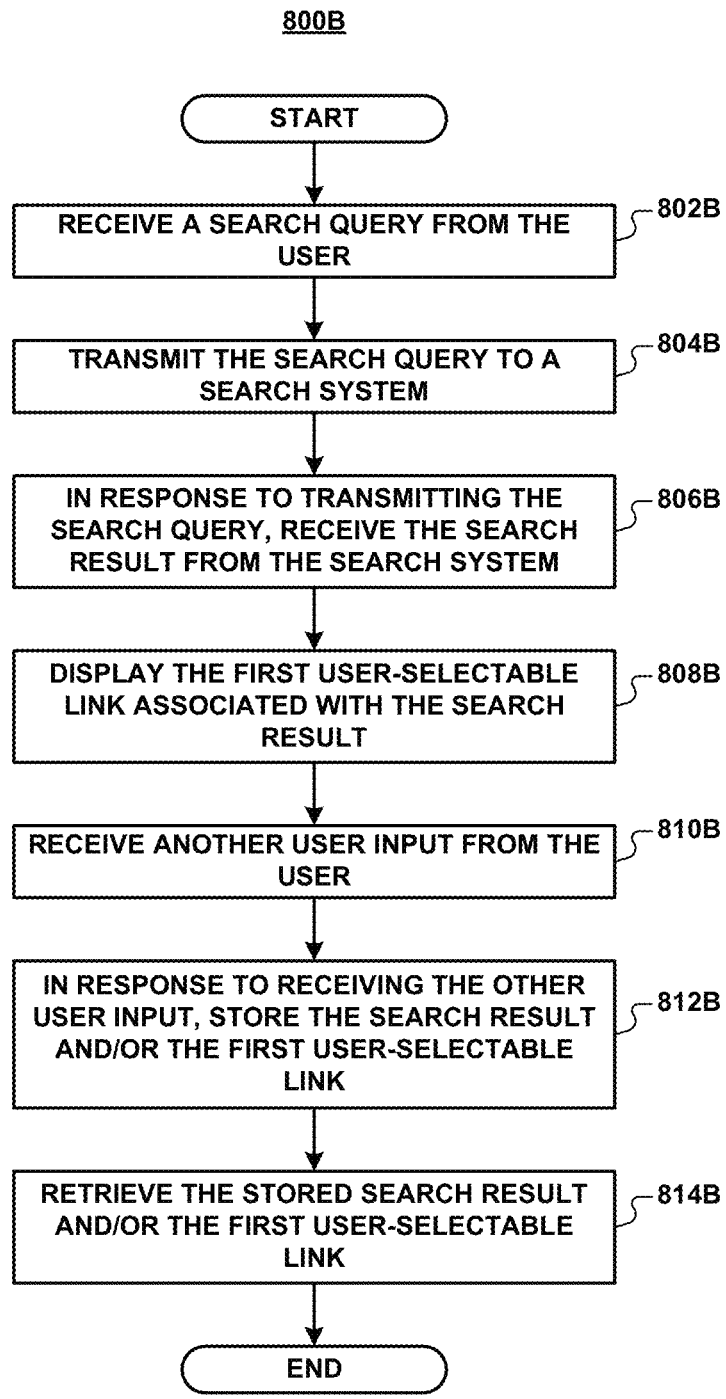

FIG. 8B is a flow diagram that illustrates an aspect of the example method 800A described with reference to FIG. 8A. For example, the operations of the example method 800B described with reference to FIG. 8B may be performed prior to performing the operations of the method 800A. In block

802B, the user device 102 may initially receive a search query 208 from the user. In block 804B, the user device 102 may transmit the search query 208 to the search system 100. In block 806B, the user device 102 may, in response to transmitting the search query 208, receive the search result 214 from the search system 100. In block 808B, the user device 102 may display the first user-selectable link associated with the search result 214. In block 810B, the user device 102 may receive another user input from the user. In block 812B, the user device 102 may, in response to receiving the other user input, store the search result 214 and/or the first user-selectable link in a data store. As shown in block 814B, the user device 102 displaying the first user-selectable link, as described with reference to block 802A, may include the device 102 retrieving the stored search result 214 and/or the first user-selectable link from the data store (e.g., in response to still another user input).

Figure 8C:
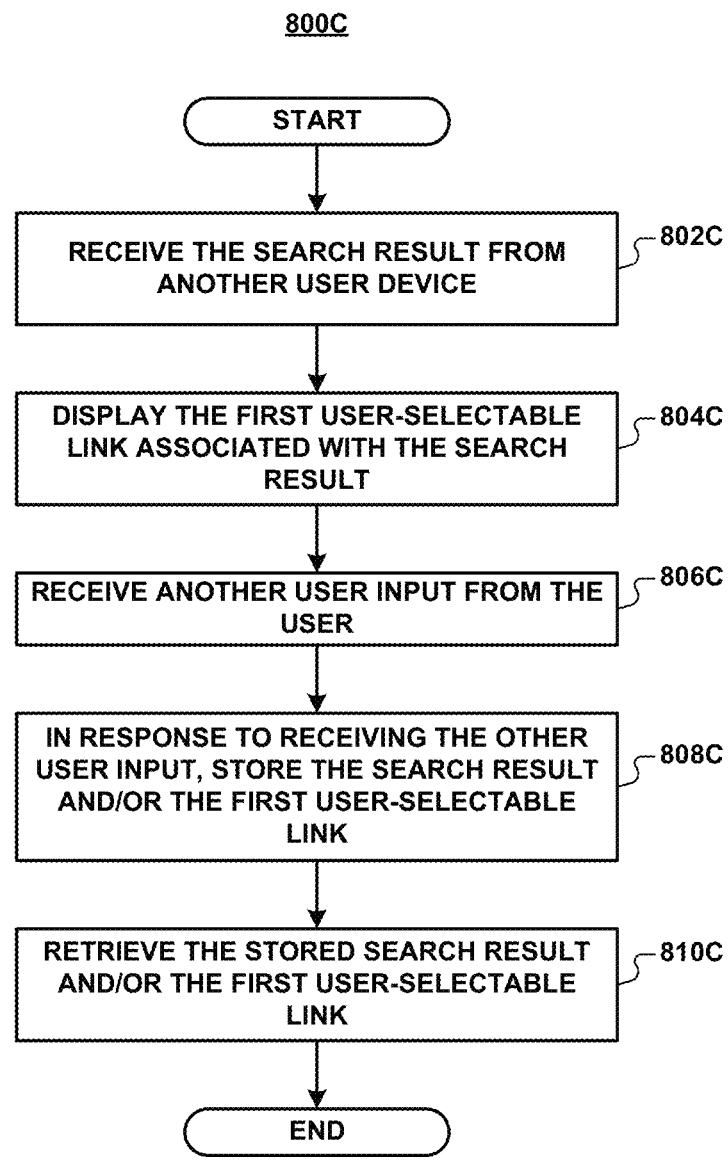

FIG. 8C is a flow diagram that illustrates another specific aspect of the example method 800A described with reference to FIG. 8A. The example method 800C includes steps that are analogous to those of the example method 800B. In the example method 800C, the user device 102 receives the search result 214 from another user device 102 via a messaging app.

The modules and data stores included in the search system 100 represent features that may be included in the system 100 as it is described in the present disclosure. For example, the search module 110, search data store 112, and result generation module 114 may represent features included in the search system 100. The modules and data stores may be embodied by electronic hardware, software, and/or firmware. Depiction of different features as separate modules and data stores does not necessarily imply whether the modules and data stores are embodied by common or separate electronic hardware, software, and/or firmware components. In general, the features associated with the modules and data stores may be realized by one or more common or separate electronic hardware, software, and/or firmware components.

The modules and data stores may be embodied by electronic hardware, software, and/or firmware components including one or more processing units, memory components, input/output (I/O) components, and interconnect components. The interconnect components may be configured to provide communication between the processing units, memory components, and I/O components. For example, the interconnect components may include one or more buses configured to transfer data between electronic components or control circuits (e.g., a memory controller and/or an I/O controller) configured to control communication among the components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray disc), and/or any other memory components. The memory components may include (e.g., store) the data described herein. For example, the memory components may store the data included in the state records 400A of the search data store 112 and/or other information. The memory components may also include instructions executed by the processing units. For example, the memory components may include computer-readable instructions that, when executed by the processing units, cause the units to perform the various functions attributed to the modules and data stores described herein.

The I/O components may refer to electronic hardware, software, and/or firmware that provide communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including display screens, keyboards, pointer devices (e.g., a mouse), touchscreens, speakers, and microphones. In other examples, the I/O components may include hardware, software, and/or firmware configured to communicate with additional devices, such as external memory (e.g., external HDDs).

In some examples, the search system 100 may be a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described herein. For example, each computing device may include any combination of the processing units, memory components, I/O components, and interconnect components described herein. The computing devices may also include various human interface devices, including display screens, keyboards, pointing devices (e.g., a mouse), touchscreens, speakers, and microphones, and may also be configured to communicate with additional devices, such as external memory.

The computing devices may be configured to communicate with the network 106. The computing devices may also be configured to communicate with one another via a computer network. In some examples, the computing devices may include one or more server computing devices configured to communicate with the user device(s) 102 (e.g., receive search queries 208 and transmit search results 214), gather data from the data source(s) 104, index the data, store the data, and store other documents. In other examples, the computing devices may reside within a single machine at a single geographic location, within multiple machines at a single geographic location, or be distributed across a number of geographic locations.

Additionally, the various implementations of the search system 100 described herein (e.g., using one or more computing devices that include one or more processing units, memory components, I/O components, and interconnect components) are equally applicable to any of the user device(s) 102, as well as to the various components thereof.

What is claimed is:

1. A method comprising:
    displaying, at a user device, a first user-selectable link associated with a first search result, wherein the first search result includes a first access uniform resource locator (URL) that specifies a first state of a first software application (app), wherein the first state is associated with one or more first entities, and wherein the first user-selectable link is configured to, upon being selected by a user of the user device, cause the user device to set the first software app into the first state;
    displaying, at the user device, a second user-selectable link associated with a second search result, wherein the second search result includes a second access URL that specifies a second state of a second software app, wherein the second state is associated with one or more second entities, and wherein the second user-selectable link is configured to, upon being selected by the user of the user device, cause the user device to set the second software app into the second state,
    receiving, at the user device, a first user input from the user of the user device, wherein the first user input specifies a set operation to be performed;
    in response to receiving the first user input, performing the set operation on the one or more first entities and the one or more second entities; and
    in response to performing the set operation on the one or more first entities and the one or more second entities:
        generating, based on a result of the set operation, a third access URL,
        displaying, at the user device, a third user-selectable link, wherein the third user-selectable link is configured to, upon being selected by the user of the user device, cause the user device to set a third software app into a third state specified by the third access URL, and wherein the third state is associated with the result of the set operation performed on the one or more first entities and the one or more second entities,
        determining, by the user device, whether the third software app includes the third state specified by the third access URL, and
        adjusting the displaying of the third user-selectable link based on the results of the determination,
    wherein the third software app is distinct from both the first software app and the second software app, and
    wherein determining whether the third software app includes the third state includes querying an app programming interface (API) associated with the third software app to determine whether the third software app includes the third state.

2. The method of claim 1, further comprising:
    receiving, at the user device, a search query from the user;
    transmitting, using the user device, the search query to a search system;
    in response to transmitting the search query, receiving, at the user device, the first search result from the search system;
    receiving, at the user device, a second user input from the user; and
    in response to receiving the second user input, storing, using the user device, one or more of the first search result and the first user-selectable link,
    wherein displaying the first user-selectable link includes retrieving, using the user device, the stored one or more of the first search result and the first user-selectable link.

3. The method of claim 1, wherein:
    the first user input includes one or more user interactions with a user menu displayed at the user device, and
    the first user-selectable link and the set operation are selected based on the one or more user interactions.

4. The method of claim 3, wherein:
    the first user-selectable link includes a portion associated with the at least one of the one or more first entities, and
    selection of the first user-selectable link includes identifying user interaction with the portion.

5. The method of claim 1, wherein the set operation includes at least one of a union operation, an intersection operation, a complement operation, a random operation, a first operation, and a last operation.

6. The method of claim 1, wherein determining whether the third software app includes the third state further includes one or more of:
    performing a search for the third state in a data store associated with the third software app;
    performing a search for the third state in the third software app executing on the user device; and
    querying a search system to determine whether the search system includes a state record that specifies the third state.

7. The method of claim 1, wherein the adjusting the displaying of the third user-selectable link based on the results of the determination includes displaying, at the user device, a graphical user interface (GUI) element indicating whether the third software app includes the third state.

8. The method of claim 7, wherein displaying the GUI element includes:
    in response to determining that the third software app includes the third state, displaying a highlighted version of at least one of the first, second, and third user-selectable links; and
    in response to determining that the third software app does not include the third state, displaying an unmodified version of each of the first, second, and third user-selectable links.

9. The method of claim 7, wherein displaying the GUI element includes:
    in response to determining that the third software app includes the third state, displaying an unmodified version of each of the first, second, and third user-selectable links; and
    in response to determining that the third software app does not include the third state, displaying a grayed out version of at least one of the first, second, and third user-selectable links.

10. The method of claim 7, wherein displaying the GUI element includes:
    in response to determining that the third software app includes the third state, displaying a highlighted version of at least one of the first, second, and third user-selectable links; and
    in response to determining that the third software app does not include the third state, displaying a grayed out version of at least one of the first, second, and third user-selectable links.

11. The method of claim 7, wherein displaying the GUI element includes displaying the GUI element while receiving a third user input and otherwise refraining from displaying the GUI element.

12. The method of claim 7, wherein displaying the GUI element includes displaying the GUI element after displaying the third user-selectable link and otherwise refraining from displaying the GUI element.

13. The method of claim 1, wherein:
the third access URL is based on the first access URL and at least one of the one or more first entities,
generating the third access URL includes (i) performing a search within the third software app based on the at least one of the one or more first entities and (ii) in response to performing the search, determining the third access URL.

14. The method of claim 1, wherein:
the third access URL is based on the first access URL and at least one of the one or more first entities, and
generating the third access URL includes querying an app programming interface (API) associated with the third software app based on the at least one of the one or more first entities and, in response to querying the API, determining the third access URL.

15. The method of claim 1, further comprising generating, using the user device, the second access URL based on the first access URL and based on the at least one of the one or more first entities, wherein generating the second access URL includes:
generating a search query based on the first access URL and based on the at least one of the one or more entities;
transmitting the search query to a search system; and
in response to transmitting the search query, receiving, at the user device, the second search result from the search system,
wherein:
the second search result is different than the first search result, and
the second search result includes the second access URL.

16. A computing device comprising:
a display;
an input/output (I/O) component configured to receive a user input from a user of the computing device;
one or more memory components configured to store computer-readable instructions; and
one or more processing units configured to execute the computer-readable instructions, wherein the computer-readable instructions, when executed by the one or more processing units, cause the one or more processing units to:
display a first user-selectable link associated with a first search result using the display, wherein the first search result includes a first access uniform resource locator (URL) that specifies a first state of a first software application (app), wherein the first state is associated with one or more first entities, and wherein the first user-selectable link is configured to, upon being selected by the user, cause the computing device to set the first software app into the first state;
display a second user-selectable link associated with a second search result, wherein the second search result includes a second access URL that specifies a second state of a second software app, wherein the second state is associated with one or more second entities, and wherein the second user-selectable link is configured to, upon being selected by the user, cause the computing device to set the second software app into the second state;
receive the user input from the user using the I/O component, wherein the user input specifies a set operation to be performed;
in response to receiving the user input, perform the set operation on the one or more first entities and the one or more second entities; and
in response to performing the set operation:
generate, based on a result of the set operation, a third access URL,
display a third user-selectable link using the display, wherein the third user-selectable link is configured to, upon being selected by a user, cause the computing device to set a third software app into a third state specified by the third access URL, and wherein the third state is associated with the result of the set operation performed on the one or more first entities and the one or more second entities,
determine whether the third software app includes the third state specified by the third access URL, and
adjust the display of the third user-selectable link based on the results of the determination,
wherein the third software app is distinct from both the first software app and the second software app, and
wherein determining whether the third software app includes the third state includes querying an app programming interface (API) associated with the third software app to determine whether the third software app includes the third state.

* * * * *